(12) United States Patent
Ciochina et al.

(10) Patent No.: US 11,012,277 B2
(45) Date of Patent: May 18, 2021

(54) METHOD AND DEVICE FOR INSERTING K PAIR OF REFERENCE SIGNAL

(71) Applicant: MITSUBISHI ELECTRIC CORPORATION, Tokyo (JP)

(72) Inventors: Cristina Ciochina, Rennes (FR); Jean-Christophe Sibel, Rennes (FR); Arnaud Bouttier, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/617,399

(22) PCT Filed: Jul. 4, 2018

(86) PCT No.: PCT/JP2018/026246
§ 371 (c)(1),
(2) Date: Nov. 26, 2019

(87) PCT Pub. No.: WO2019/021830
PCT Pub. Date: Jan. 31, 2019

(65) Prior Publication Data
US 2020/0162295 A1    May 21, 2020

(30) Foreign Application Priority Data

Jul. 25, 2017 (EP) .................................... 17305995

(51) Int. Cl.
*H04L 27/26* (2006.01)
(52) U.S. Cl.
CPC ...... *H04L 27/2613* (2013.01); *H04L 27/2628* (2013.01)
(58) Field of Classification Search
None
See application file for complete search history.

(56) References Cited

U.S. PATENT DOCUMENTS

| 2011/0216842 | A1 | 9/2011 | Zhang et al. |
| 2012/0300726 | A1 | 11/2012 | Han et al. |
| 2016/0359646 | A1* | 12/2016 | Iqbal ................. H04L 25/03159 |

FOREIGN PATENT DOCUMENTS

| JP | 2013-517667 A | 5/2013 |
| KP | 10-2012-0089480 A | 8/2012 |

OTHER PUBLICATIONS

Zhang et al., "Joint Suppression of Phase Noise and CFO by Block Type Pilots," Communications and Information Technology, IEEE, Piscataway, NJ, USA, Sep. 28, 2009, pp. 466-469.

(Continued)

*Primary Examiner* — Christine T Duong
(74) *Attorney, Agent, or Firm* — Birch, Stewart, Kolasch & Birch, LLP

(57) ABSTRACT

The invention relates to inserting a first and a second Reference Signals in a radio signal to be transmitted over a wireless communication system, the radio signal being emitted according to a specific SC-SFBC scheme, the method comprising:
  determining K integers such as $$\left\{ n_i \mid i \in [\![1; K]\!], 0 \le n_i \le \frac{M}{2} - 1, \forall i, j \in [\![1; K]\!]^2, i < j \Rightarrow n_i < n_j \right\};$$

and for each pair i of first and second Reference Signals:
  inserting the first Reference Signal in the radio signal, such as samples of the first Reference Signal are in time periods in the radio signal, said time periods being dependent on a first position in the block of symbols processed by the specific SC-SFBC scheme;
  inserting the second Reference Signal in the radio signal, such as samples of the second Reference Signal are in (Continued)

time periods in the radio signal, said time periods being dependent on a specific position according to the first position in the same block of symbols.

18 Claims, 11 Drawing Sheets

(56) References Cited

OTHER PUBLICATIONS

Ciochina et al., "A novel space-frequency coding scheme for single carrier modulations", IEEE 18th International Symposium on Personal, Indoor and Mobile Radio Communications, 2007, 5 pages.
Japanese Office Action for Japanese Application No. 2019-551721, dated Nov. 24. 2020, with English translation.
Office Action dated Jan. 22, 2021 in corresponding Korean Application No. 10-2020-7001277.

\* cited by examiner

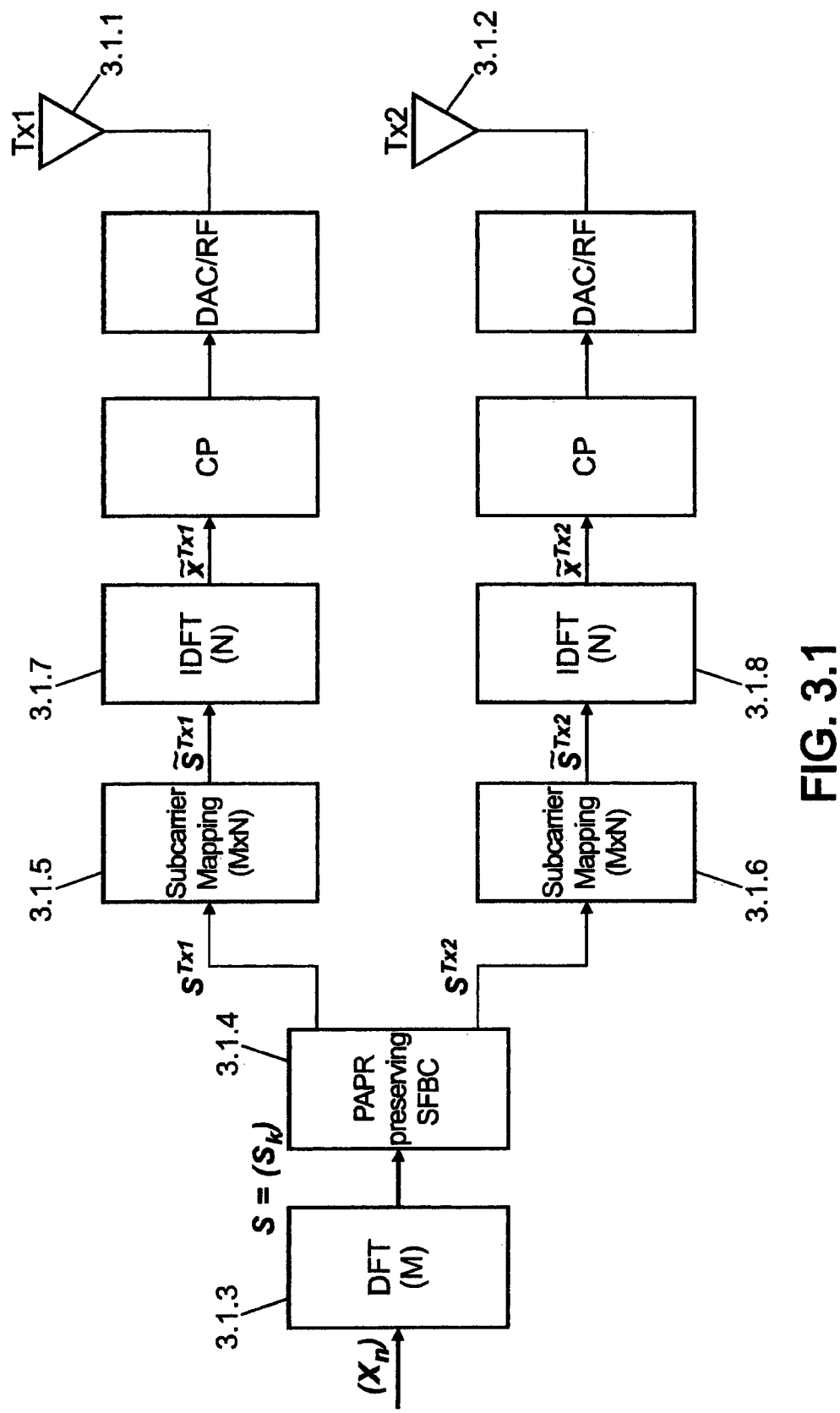
FIG. 3.1

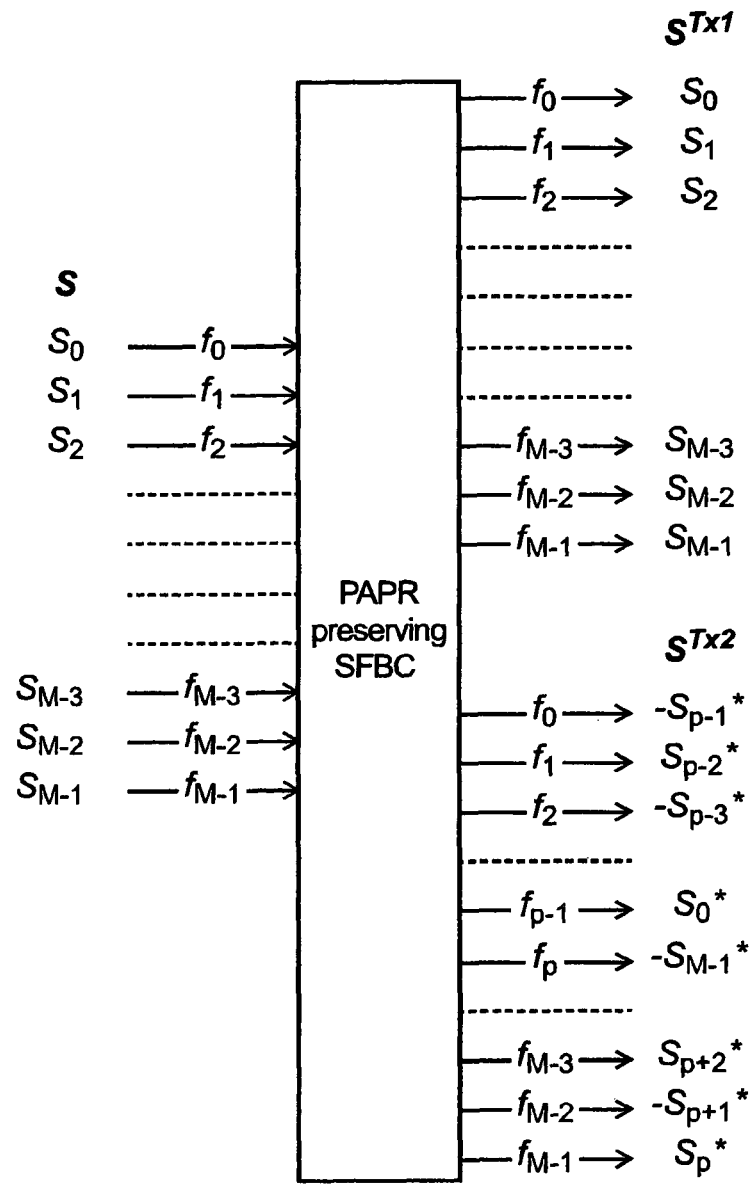
FIG. 3.2

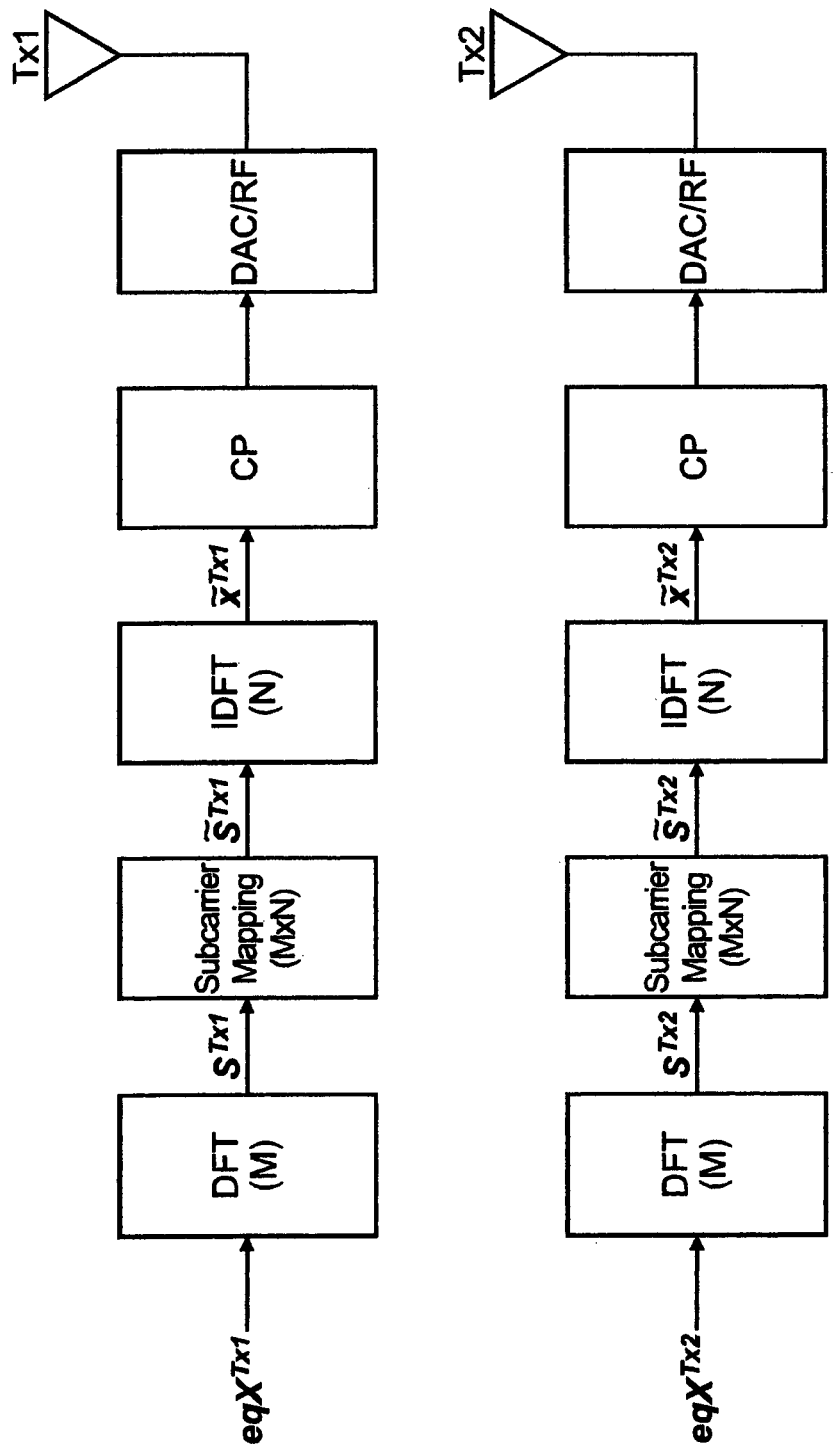
FIG. 3.3

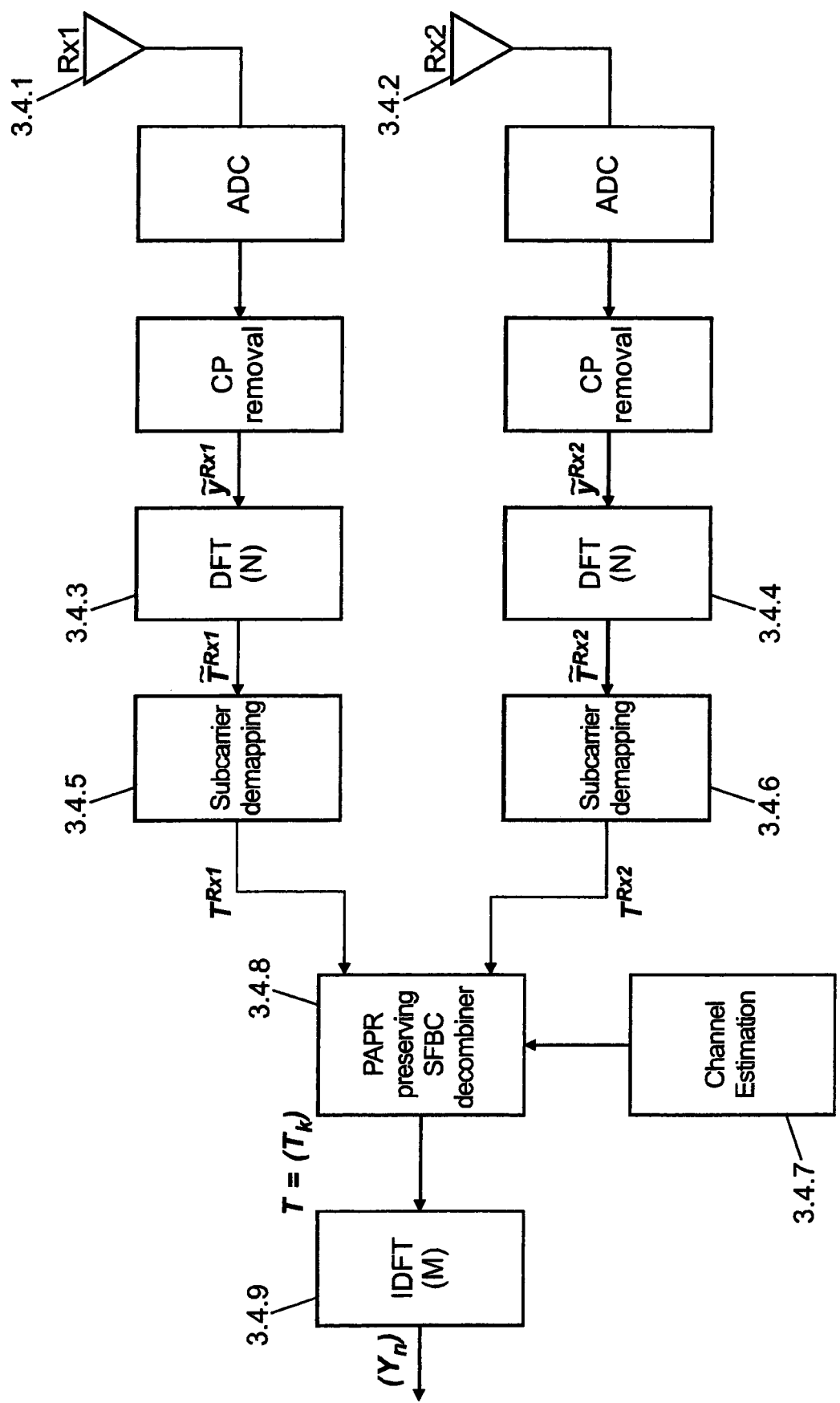
FIG. 3.4

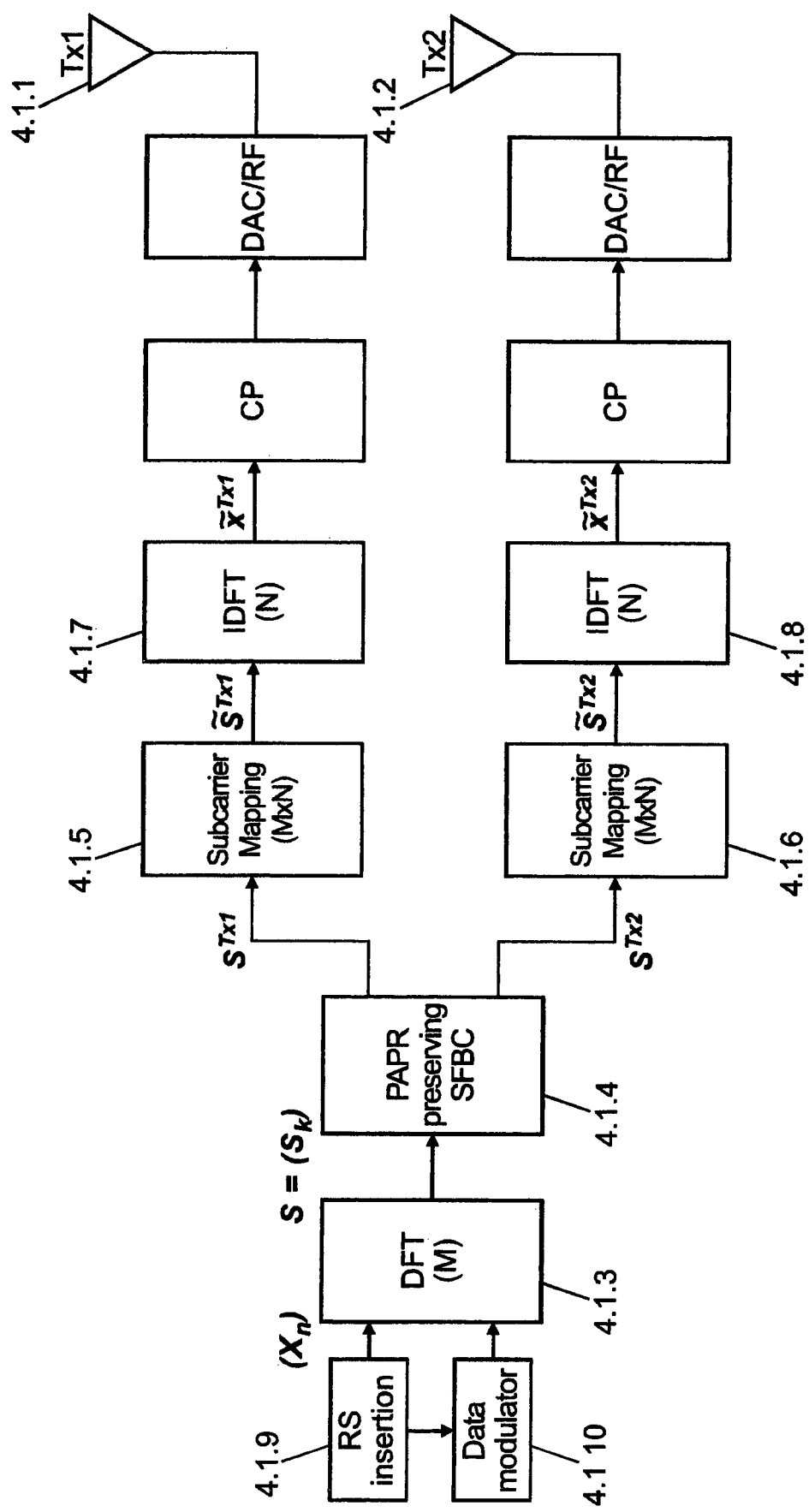
FIG. 4.1

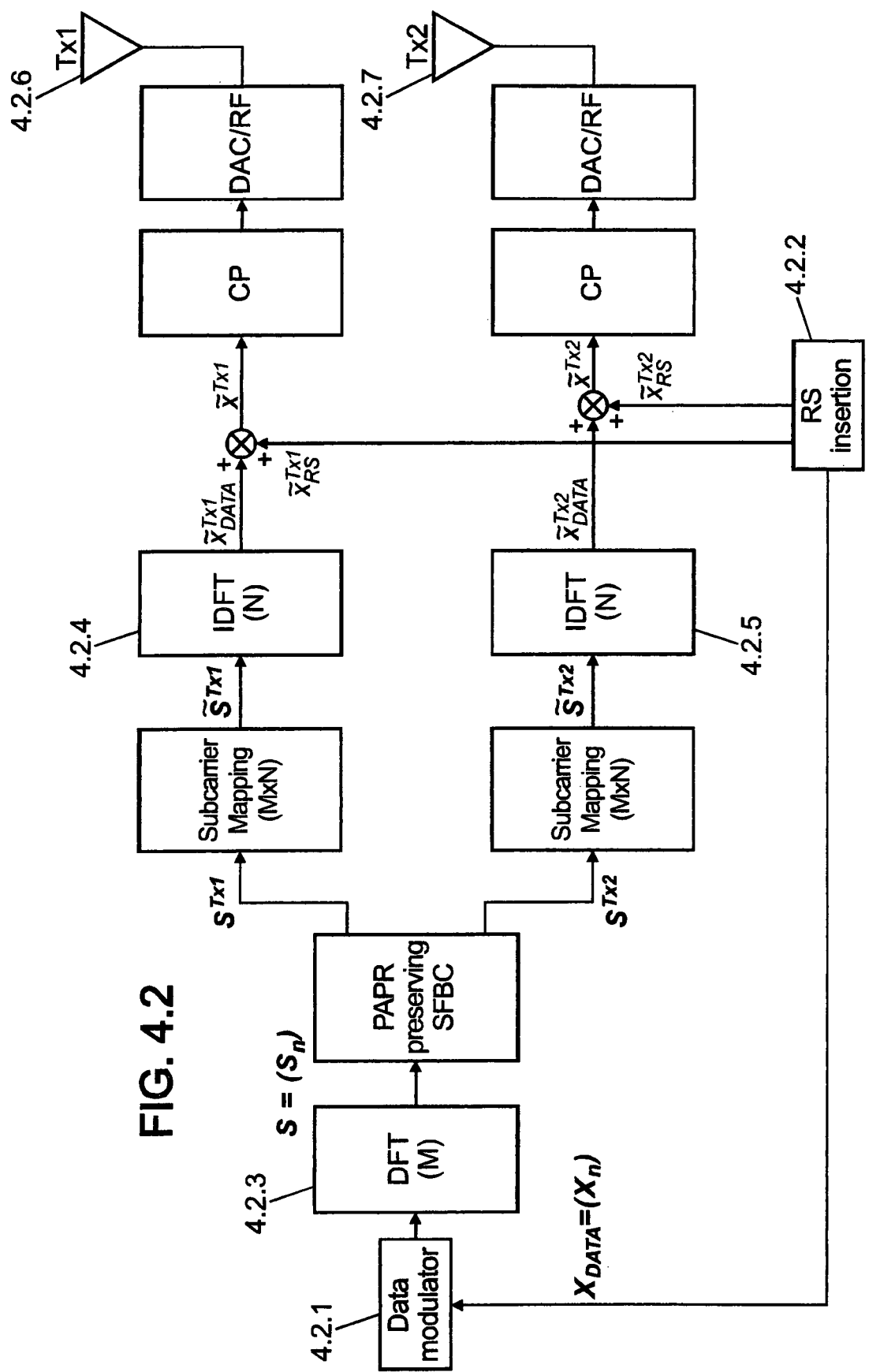
FIG. 4.2

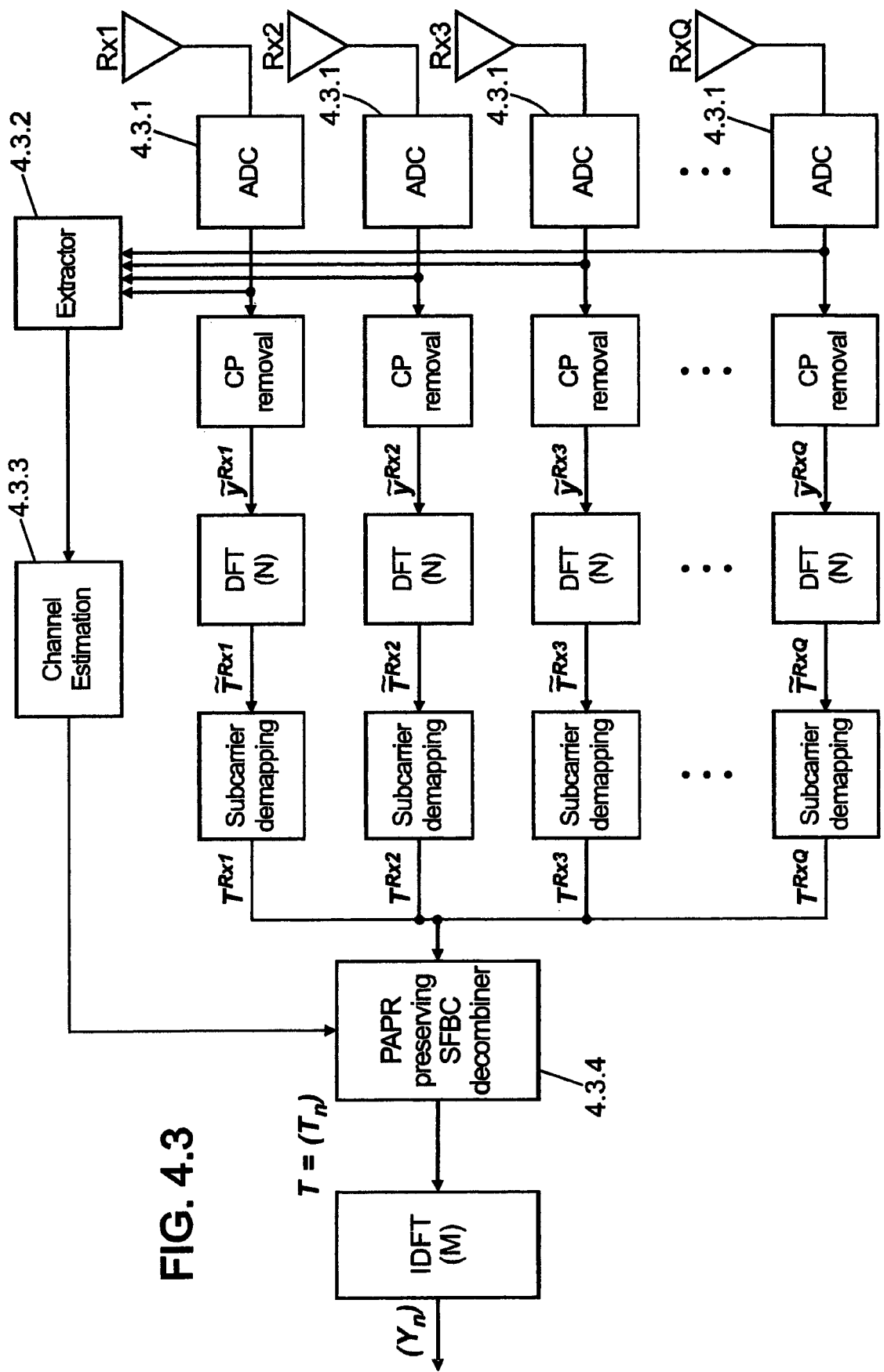
FIG. 4.3

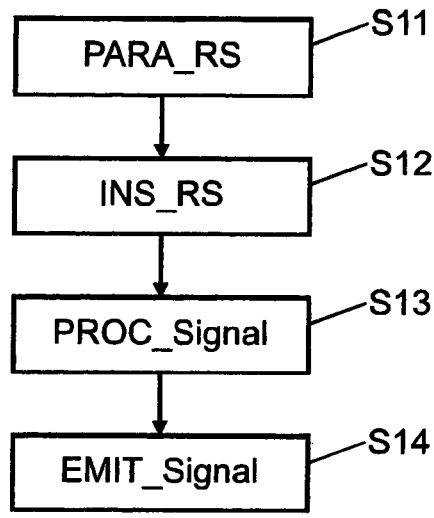
FIG. 5.1
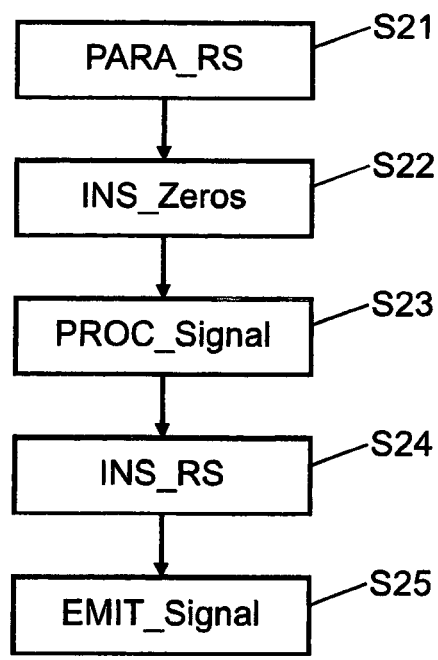
FIG. 5.2

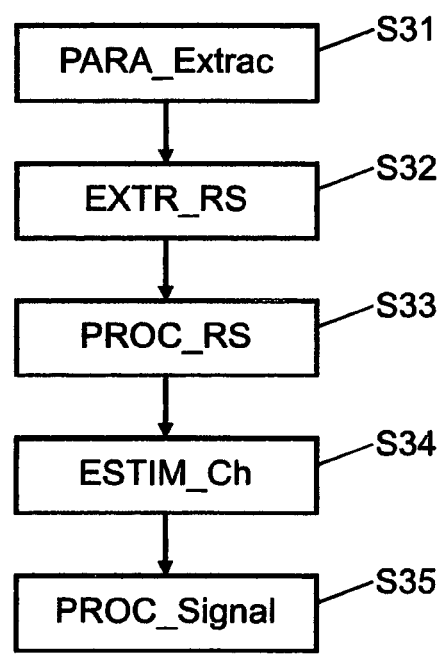
FIG. 5.3

METHOD AND DEVICE FOR INSERTING K PAIR OF REFERENCE SIGNAL

TECHNICAL FIELD

The present invention generally relates to the domain of telecommunication system, and more specifically the insertion of reference signals in the context of MIMO (Multiple Input Multiple Output) or MISO (Multiple Input Single Output) communications especially used in combination of OFDM-like transmission schemes.

BACKGROUND ART

The present invention applies in MIMO or MISO telecommunication systems using SC-SFBC or variants of SC-SFBC. These SC-SFBC-like schemes have been developed to offer low PAPR (peak-to-average power ratio), full diversity in the context of MISO or MIMO transmission and to preserve the single carrier property of the OFDM-like schemes.

Indeed, single carrier frequency-division multiple access (SC-FDMA) also known as DFTsOFDM has been chosen in several communication standards, including LTE, for its low PAPR (peak-to-average power ratio) which enables to reduce the energy consumption of the transmitter.

DFTsOFDM consists in applying a M-size DFT (discrete Fourier transform) to a block of symbols $X=(X_0, \ldots X_{M-1})$, obtaining M complex symbols $S_k$ in the frequency domain, and mapping the resulting M samples $S_k$ in the frequency domain to M out of N inputs of a N-point IDFT (inverse discrete Fourier transform), obtaining thus at the output of the IDFT a signal $\tilde{x}=(\tilde{x}_0, \ldots, \tilde{x}_{N-1})$ occupying, during each time interval corresponding to a DFTsOFDM symbol, M allocated subcarriers out of the N existing subcarriers. The signal $\tilde{x}$ is a time-domain signal whose frequency-domain representation, during a given time interval, are the complex symbols $S_k$ for each $k^{th}$ occupied subcarrier with k=0 to M−1. Equivalently, the time-domain signal $\tilde{x}$ during a given time interval represents, in the frequency domain, the complex symbols $S_k$ for each $k^{th}$ frequency with k=0 to M−1.

It is known (Hyung G. Myung Single Carrier Orthogonal Multiple Access Technique for Broadband WirelessCommunications Ph.D. Thesis Defense|2006.12.18) that, for a localized subcarrier mapping, the signal in the time domain at the IDFT output has exact copies of input time symbols $X_n$ (with a scaling factor) in the M-multiple sample positions $\tilde{x}_{M.n}$, and in-between values are sum of all the time input symbols in the input block with different complex-weighting, when N is a multiple of M. Signal $\tilde{x}$ is an oversampled version of the block of symbols X. If, for example, a block of symbols $X^{(n)}=(0, \ldots, 0, X_n, 0, \ldots, 0)$ with $X_n$ non-null is presented to the input of a DFTsOFDM modulator, that is to the input of the M-size DFT, among the samples in the radio signal $\tilde{x}$ corresponding to symbol $X_n$, only a part will be of high energy. It is also known that, for a completely distributed subcarrier mapping, signal $\tilde{x}$ is a repetition of the block of symbols X and therefore if a block of symbols $X^{(n)}=(0, \ldots, 0, X_n, 0, \ldots, 0)$ with $X_n$ non-null is presented to the input of a DFTsOFDM modulator, among the samples in the radio signal $\tilde{x}$ corresponding to symbol $X_n$, only a part will be of high energy. For other subcarrier mapping types and/or non-integer N/M ratios similar relationships between the pre-DFT symbol $X_n$ and corresponding samples in the radio signal (among which only a fraction have high energy if a block of symbols $X^{(n)}=(0, \ldots, 0, X_n, 0, \ldots, 0)$ is presented to the input of a DFTsOFDM modulator) can be established. Therefore, for each position n, the high energy samples in the time-domain signal $\tilde{x}$ corresponding to symbol $X_n$ can be identified, the positions of the high energy samples being dependent on the position n. Such high energy samples are thus in the radio signal in time periods dependent on the position n of symbol $X_n$. Within the current state of the art, the time periods can be identified based on the exact subcarrier allocation and of the N/M ratio for a DFTsOFDM symbol. For each position n of symbol $X_n$ within the symbol block, said time periods only depend on the exact subcarrier allocation and on the N/M ratio and do not depend on the value assigned to symbol $X_n$.

By high energy samples corresponding to symbol $X_n$ in signal $\tilde{x}$ we understand those samples $\tilde{x}_k$ for which the values $abs(\tilde{x}_k/X_n)$ are superior to a given threshold Th1 conveniently chosen when a block of symbols $X^{(n)}=(0, \ldots, 0, X_n, 0, \ldots, 0)$ with a non-null value assigned to $X_n$ is presented to the input of a DFTsOFDM modulator whose output is signal $\tilde{x}=(\tilde{x}_0, \ldots, \tilde{x}_{N-1})$.

Equivalently high energy samples corresponding to symbol $X_n$ are the sample(s) corresponding to symbol $X_n$ which may be efficiently processed to retrieve the information related to symbol $X_n$. Thus, the high energy sample or at least the high energy samples corresponding to symbol $X_n$ are the samples that have, relatively to the other samples (referred to as low energy samples or samples containing residual information) corresponding to symbol $X_n$, the most important contribution to the correct estimation of symbol $X_n$.

Since only high energy samples have interest in the case of the present invention (the samples containing residual information are considered as interference) we refer to them indifferently as high energy samples or as samples.

By samples containing residual information on a symbol $X_n$ in signal $\tilde{x}$ we understand those samples $\tilde{x}_k$ for which the values $abs(\tilde{x}_k/X_n)$ are inferior to a given threshold Th2 conveniently chosen when a block of symbols $X^{(n)}=(0, \ldots, 0, X_n, 0, \ldots, 0)$ with a non-null value assigned to $X_n$ is presented to the input of a DFTsOFDM modulator whose output is signal $\tilde{x}=(\tilde{x}_0, \ldots, \tilde{x}_{N-1})$.

Nonetheless, in MIMO the use of multiple antennas for the transmitter and the receiver has brought performance enhancement. The Alamouti precoding has been introduced in such a case ensuring full diversity for a rate of one symbol per channel use. The Alamouti precoding can be implemented in a SC-FDMA transmitter with two transmit antennas and M out of N subcarriers, per antennas, allocated to a user.

When implementing Alamouti precoding as a space-frequency block coding (FIG. 2), that is by implementing Alamouti precoding to adjacent frequency samples $S_k$ and $S_{k+1}$ resulting from the DFT of the same data block, the PAPR is significantly increased.

Therefore, to avoid this PAPR increase, a SC-SFBC-like scheme using the Alamouti precoding within the same SC-FDMA block, between non-adjacent frequency samples (FIG. 3.1) has been developed. Therefore, instead of implementing the Alamouti precoding to each pairs of $(S_k; S_{k+1})$ of the M outputs of the DFT of the same data block, it is implemented to each pairs of $(S_k; S_{p-1-k})$ of the M outputs of the DFT of the same data block, p-1-k being modulo M, where M is the size of the DFT and p is an even integer. The Alamouti precoding matrices implemented are:

$$A^{(I)} = \begin{bmatrix} S_k & -S_{p-1-k}^* \\ S_{p-1-k} & S_k^* \end{bmatrix}$$

when k is even and $$A^{(II)} = \begin{bmatrix} S_k & S_{p-1-k}^* \\ S_{p-1-k} & -S_k^* \end{bmatrix}$$

when k is odd, where each column represents a transmit antenna (Tx1 and Tx2) and each row represents a frequency of the subcarriers for each pairs of ($S_k$; $S_{(p-1-k)[M]}$). The outputs of the PAPR preserving SFBC on FIG. 3.2 are the vector $S^{Tx1}$ and $S^{Tx2}$ represented on FIG. 3.2. $S^{Tx1}$ being the vector intended to be transmitted through the transmitter 1 and $S^{Tx2}$ being the vector intended to be transmitted through the transmit antenna 2.

Like shown in the literature (C. Ciochina, D. Castelain, D. Mottier and H. Sari, "A Space-Frequency Block Code for Single-Carrier FDMA," Electronics Letters 44(11):690-691 Feb. 2008.) the signal sent on the Tx1 and on the Tx2 have the same PAPR, thus both have a SC-type envelope fluctuations, leading to low PAPR. It is known that the signals sent on the Tx1 and on the Tx2 are both DFTsOFDM signals and it has been shown (C. Ciochina, D. Castelain, D. Mottier and H. Sari, "A Novel Space-Frequency Coding Scheme for Single-Carrier Modulations," 18th Annual IEEE International Symposium on Personal, Indoor and Mobile Communications (PIMRC'07), Athens, Greece, September 2007.) that the DFTsOFDM symbols on Tx1 and respectively Tx2 can be obtained from blocks of symbols eq$X^{Tx1}$ and eq$X^{Tx2}$ respectively (FIG. 3.3). Therefore, the concept of high energy samples and/or of samples containing residual information corresponding to symbol $X_n$ in signal x̃, already defined in a DFTsOFDM context, can be applied in a straightforward manner to a SC-SFBC transmitter, which is a specific type of DFTsOFDM transmitter.

In such a SC-SFBC implementation of Alamouti precoding, at the receiver side (FIG. 3.4) after going through a guard removal or CP removal the symbols received go through N-sized DFT modules before demapping the M out of N occupied subcarriers. Then frequency domain equalization and Alamouti decombining is performed (for example MMSE, minimum mean square error) in the frequency domain on pairs of subcarriers Alamouti-precoded together) before retrieving the modulation symbols.

In millimeter-Wave systems, which is the case of the new radio standard or 5G currently at normalization, operations performed at high carrier frequency level are subject to strong/fast phase variations. This makes the tracking of the channel state difficult, especially when reference signals (RS) are set in blocks, that is in blocks of symbols dedicated to reference signals and occupying one whole DFTsOFDM symbol, since a strong variation phase can occur between two successive transmissions of RS transmitted in dedicated DFTsOFDM symbols.

On the other side, inserting RS occupying less than one whole DFTsOFDM symbol, to track more efficiently any corruption of the signal—for example the phase variations—requires to insert the RS with the data modulation symbols in the block presented at the DFT input, to allow conserving the low PAPR of DFTsOFDM waveform. Nonetheless, contrary to the case where reference signals are set in dedicated blocks, when inserting reference signal multiplexed with the data modulation symbols at the DFT input, at the receiver side the reference signal may only be extracted after the IDFT 3.4.9 in FIG. 3.4. Therefore, the extraction is done once the different modules of the SC-SFBC receiving scheme have been applied, that is these modules may be applied on corrupted symbols without any compensation. Thus the performance of such a receiver, and especially the Alamouti de-combiner, can be strongly degraded when the symbols are strongly corrupted.

The present invention aims at improving the situation.

To that end, the invention relates to a method for inserting K pairs of a first and a second Reference Signals in a radio signal to be transmitted over a wireless communication system, said radio signal being intended to be emitted by an emitter comprising at least two transmit antennas, each antenna being configured for transmitting on at least an even number M, strictly greater than 4, of different frequencies, and K being a strictly positive integer strictly smaller than M/2, said radio signal being provided by:

applying a M size DFT to a block of symbols X= ($X_0, \ldots X_{M-1}$), and obtaining for each $k^{th}$ frequency, with k=0 to M−1, a complex symbol $S_k$ in the frequency domain;

obtaining, at an output of an IDFT module corresponding to a first transmit antenna, during a given time interval a first signal representing, in the frequency domain, the complex symbols $S_k$ for each $k^{th}$ frequency with k=0 to M−1;

obtaining, at an output of an IDFT module corresponding to a second transmit antenna, during the given time interval a second signal representing, in the frequency domain, the complex symbols $(-1)^{k+1} \varepsilon S^*_{(p-1-k)[M]}$ for each $k^{th}$ frequency, with k=0 to M−1 and p a predefined even integer lower or equal to M−1 and higher or equal to 0 and ε is 1 or −1 and $S_k^*$ being the complex conjugate of $S_k$;

emitting the radio signal corresponding to the first and second signal; said method comprising:

determining K integers such as $$\{n_i \mid i \in [\![1; K]\!], 0 \le n_i \le \frac{M}{2} - 1, \forall\, i, j \in [\![1; K]\!]^2, i < j \Rightarrow n_i < n_j\};$$

and for each pair i of first and second Reference Signals:

inserting the first Reference Signal in the radio signal, such as high energy samples of the first Reference Signal are in time periods in the radio signal, said time periods being dependent on a position $n_i$ of the symbol $X_{n_i}$ in the block of symbols;

inserting the second Reference Signal in the radio signal, such as high energy samples of the second Reference Signal are in time periods in the radio signal, said time periods being dependent on the position $n_i+M/2$ of the symbol $X_{(n_i+M/2)}$ in the block of symbols.

According to the invention the high energy samples of the first Reference Signal in the radio signal are emitted, on one transmit antenna, in the same time periods when the high energy samples of the second Reference Signal are transmitted from the other transmit antenna. Time periods including the high energy samples of a pair of first and respectively second Reference Signals for one transmit antenna are the same as the time periods including the high energy samples of a pair of second and respectively first Reference Signals for the other transmit antenna. Therefore, in those time periods, information relative to the first and second Reference Signals are emitted from the two transmit antennas emitting the SC-SFBC signal, and no information (or only residual information) relative to non-reference signals are emitted in said time periods. That is reference signals are time domain superposed in time periods at the emitter side, and consequently information relative to reference signals is received in corresponding time periods at the receiver side. Such insertion of samples of the reference signals in the radio signal provided by the specific scheme (SC-SFBC-like scheme) applied on the block of symbols, enables to separate at the receiver side the information relative to samples of the reference signal from the information relative to samples of other modulation symbols. Therefore, the invention enables a receiver to extract parts of the signal containing the information relative to the transmitted reference signals samples, in the time domain, without extracting parts of the signal containing information relative to samples of non-reference signals, or at the most extracting only parts of the signal containing residual information relative to the samples of non-reference signals.

Indeed, if the high energy samples of reference signals and non-reference signals were emitted from different transmit antennas in the same time periods, they would appear time-domain superposed at the receiver side in the corresponding time period. This would require to apply the full receiving scheme before being able to separate information relative to reference signals from information relative to non-reference signals at the receiver side.

The scheme which provides the radio signal, according to the invention, for example a SC-SFBC, is a linear scheme, that is the radio signal issued from applying the scheme on block symbols $X=(X_0, \ldots X_{M-1})$, is equal to the radio signal which is the sum of signals (the sum is realized just after applying the IDFTs onto each transmit antenna) respectively issued from applying the scheme on blocks symbols $X^{(0)}=(X_0, 0, \ldots, 0), \ldots X^{(n)}=(0, \ldots, 0, X_n, 0, \ldots, 0), \ldots X^{(M-1)}=(0, \ldots, 0, X_{M-1})$. Each such post-IDFT signal issued from applying the scheme on the block of symbols $X^{(n)}=(0, \ldots, 0, X_n, 0, \ldots, 0)$ is referred to as the samples in the radio signal corresponding to symbol $X_n$. The high energy samples of each such post-IDFT signal issued from applying the scheme on the block of symbols $X^{(n)}=(0, \ldots, 0, X_n, 0, \ldots, 0)$ are in time periods dependent on the position n of symbol $X_n$ within the block of symbols.

Moreover, in the radio signal, the samples corresponding to different symbols $X_n$ may overlap in the time domain (at least with the samples containing residual information), each set of such samples contributes to the radio signal. The radio signal issued from applying the scheme on block symbols $X=(X_0, \ldots, X_{M-1})$ is equal to the sum of the samples corresponding to the symbols $X_n$, n integer from 0 to M−1. Here, the samples corresponding to different symbols $X_n$ can be seen, from a mathematical point of view, as a multi-dimensional structure having as dimensions the size N of the IDFTs and the number of transmit antennas.

By samples in the radio signal corresponding to symbol $X_n$ (or samples of the corresponding symbol $X_n$) it is understood that there exists a value $\rho_n$ such as the samples in the radio signal can be obtained by applying the specific scheme to the block $X^{(n)}$, with the value of $X_n$ set to $\rho_n$. This only defines the samples corresponding to symbol $X_n$ in the radio signal but does not limit the way such samples can be obtained. The symbol $X_n$ is referred to as the corresponding symbol of the samples, such value $\rho_n$ is referred to as a corresponding value of the samples.

The samples in the radio signal corresponding to symbol $X_n$ can be inserted in the radio signal in different ways. For example, the value of the symbol $X_n$ is set to a corresponding value $\rho_n$ and the specific scheme is applied to a block of symbols containing the corresponding value in position n. In another example, the value of the corresponding symbol $X_n$ is set to 0 in the block of symbols, and the samples corresponding to symbol $X_n$ are added at the output of the IDFT. In yet another example, desired samples in the radio signal corresponding to symbol $X_n$ can be obtained through frequency domain processing.

As mentioned above the samples in the radio signal corresponding to symbol $X_n$ can be obtained in different ways, thus the corresponding value $\rho_n$ can be theoretical. That is, there is no such symbol of value $\rho_n$ in the block of symbol on which is applied the specific scheme, but instead the samples can be added to the output of the IDFT instead of processing the corresponding symbol $X_n$. The invention encompasses the embodiments where the insertion of the reference signals is done in the time domain, that is pre-DFT or post-IDFT, but also where the insertion of reference signals is done in the frequency domain, that is after applying a DFT but before applying the IDFT.

High energy samples in the radio signal corresponding to symbol $X_n$ are emitted during specific time periods. The times of emission of these high energy samples are dependent to the position n of the corresponding symbol in the block of symbol. The times of emissions can be different on different antennas for the emission of the high energy samples in the radio signal corresponding to a given symbol $X_n$.

Thus by time periods dependent on the position n we relate to the time periods during which the high energy samples in the radio signal corresponding to symbol $X_n$, at the position n in the block of symbols, are emitted relatively to the beginning of the emission of the bloc of symbol.

SUMMARY OF INVENTION

Therefore, and as mentioned before, the time periods dependent on the position n+M/2 of the symbol $X_{(n+M/2)}$ in the block of symbols are the same as the time periods dependent on the position n of the symbol $X_n$. During these time periods, emission of high energy samples in the radio signal corresponding to symbols $X_n$ and respectively $X_{n+M/2}$ occur from different transmit antennas.

By time interval it is understood as the time duration during which the samples corresponding to all the symbols $X_n$ with n=0 to M−1 are emitted.

By reference signals the invention encompasses all corresponding symbols that are known by the receiver regarding their values and their positions, and on the basis of which the receiver can estimate the impact of the channel between the transmitter and the receiver. For example, based on the received version of the reference signals (e.g. corrupted by channel and/or noise and/or phase noise, etc.), the receiver can estimate the channel and/or improve the channel estimation quality. Note that the channel encompasses here all effects including propagation and hardware impact such as nonlinearities, phase noise, etc.

The M−2K symbols that are not reference signals may result from any other type of data such as control data other than reference signal or user data.

The scheme applied is well described in the document (Cristina Ciochina et al.: "Single-Carrier Space-Frequency Block Coding: Performance Evaluation", Vehicular Technology Conference, 2007. VTC-2007 Fall. 2007 IEEE 66th, IEEE, P1, Sep. 1, 2007, pp. 715-719) and in document EP2127179.

The transmit antennas are configured for transmitting on M frequencies, that is that the signal emitted by such transmitting antennas is provided by applying an N-size IDFT on M complex symbols, one complex symbol for each of the M allocated subcarriers. Previous to the IDFT, the M subcarriers may be mapped with a subcarrier mapping module on a greater number of N subcarriers. N-M of these subcarriers are not allocated subcarriers since they are set to zero, the M other subcarriers are M allocated subcarriers, on which the M complex symbols are mapped. In this case the IDFT module is of size N.

The radio signal is understood as the signal provided by all the transmit antennas together.

By (A)[B] it is understood as A modulo B.

K may be chosen higher than a predefined threshold, to ensure that the phase tracking and/or channel estimation is efficient and enables to compute a reliable channel estimate.

K may be chosen lower than a predefined threshold, to reduce the number of reference signals being transmitted, thus enabling to transmit more data and increase the throughput.

According to an aspect of the invention, for each pair i, i=1 . . . K, inserting the first and second Reference Signals is done by setting values of symbol $X_{n_i}$ and symbol $X_{(n_i+M/2)}$ to respectively values representing the first and second Reference Signals of pair i, before applying the DFT.

In this embodiment the reference signals are inserted at a pre-DFT level, in the block of symbols. The values of the symbols $X_{n_i}$ and $X_{(n_i+M/2)}$ are therefore set at values known by the receiver. Such an implementation can easily be adapted in any standard emitter and therefore can be implemented in all transmitters. Moreover, there is no need of additional operations such as post-IDFT processing or memory storage of the samples of the reference signals.

Values representing reference signals are the values of the reference signals, that are the corresponding values of the samples of the reference signals which are known by the receiver. These values, to which the symbols $X_{n_i}$ and $X_{(n_i+M/2)}$ are set to, can be for examples values of symbols of a digital modulation scheme, or values taken from a CAZAC sequence as mentioned below.

According to an aspect of the invention, the method further comprises setting the values of the symbols $X_{n_i}$ and the symbols $X_{(n_i+M/2)}$ to 0, at least for some pairs i ∈ ⟦1;K⟧, at the DFT input, and obtaining a subsequent first and second signals at an output of the respective IDFT modules; and wherein for each of said pairs i, inserting the first and second Reference Signals is done by adding the samples of the first Reference Signal and the samples of the second Reference Signal of said pairs i to said subsequent signals at the output of the respective IDFT modules.

This enables to process only the non-reference signal symbols through the specific scheme applied, according to the invention, to the block of symbols. Therefore, reference signal symbols and non-reference signal symbols can be processed in different manners. This enables for example to process the samples of the reference signals once and for all. This enables for example to control the interference of the samples of the reference signals onto the samples of non-reference signals by specific processing applied onto the samples of the reference signals.

The samples of the reference signals are previously computed to obtain samples identical or at least equivalent (that is identical in regard of the high power samples) to those that would have been obtained by pre-DFT insertion of the reference signals, that is by setting for at least some of the pairs i—the values of the symbols $X_{n_i}$ and the symbols $X_{(n_i+M/2)}$, with i ∈ ⟦1;K⟧, to values known by the receiver. The samples of the reference signals may be samples computed by applying the specific scheme on the block of symbols with the values of the symbols $X_{n_i}$ and $X_{(n_i+M/2)[M]}$, with i ∈ ⟦1;K⟧ set to the values representing reference signals and the values of the other symbols of the block of symbols are set to 0. The samples of the reference signals are inserted to obtain the same or equivalent radio signal as if they were inserted pre-DFT.

The subsequent signals are the signal provided by the SC-SFBC type scheme (specific DFTsOFDM scheme) that are at the respective outputs of the IDFT modules as shown in FIG. 4.2, which in this case is obtained by applying the scheme to a block of symbols where the values of the symbols $X_{n_i}$ and the symbols $X_{(n_i+M/2)[M]}$ are set to 0, at least for some pairs i with i ∈ ⟦1;K⟧. It is also possible to insert the reference signals in the frequency domain that is after applying a DFT but before applying the IDFT.

According to an aspect of the invention, the method further comprises, to set the subsequent signal to 0 at least during one of the time periods dependent on the position $n_i$, for at least one i ∈ ⟦1;K⟧, and/or to 0 at least during one of the time periods dependent on the position $n_i$+M/2, for at least said i ∈ ⟦1;K⟧, before inserting the samples of the first and second Reference Signals of pair i.

When applying the specific scheme to the block of symbols, with values of the symbols $X_{n_i}$ and the symbols $X_{(n_i+M/2)}$ set to 0, at least for some pairs i with i ∈ ⟦1;K⟧, interference from the symbols $X_n$ with n different from $n_i$ and ($n_i$+M/2) [M] for said pairs i may occur in time periods in which are inserted the samples of the reference signal, that is in the time periods dependent in the positions $n_i$ and $n_i$+M/2, with said i ∈ ⟦1;K⟧. Therefore, the subsequent signals are set to zero during those time periods, or at least during time periods of the high energy samples of the reference signals of said pairs i, thus, the interference is decreased.

According to an aspect of the invention, the method further comprises determining:

a number L of pairs of positive integer $k_l$ and $k'_l$ with l ∈ ⟦1;L⟧, with

L strictly greater than 1, such as:

$k_1=1, k'_L=K,$ $\forall l \in ⟦1;L-1⟧, k_l < k'_l < k_{l+1} < k'_{l+1},$ a positive integer d strictly greater than 1;
the K integers $n_i$, with i ∈ ⟦1;K⟧ such as:

$\forall l \in ⟦1;L-1⟧, n_{k_{l+1}} - n_{k'_l} \geq d$ $\forall l \in ⟦1;L⟧, n_{k'_l} - n_{k_l} = k'_l - k_l$ This enables to set groups of contiguous reference signals, that is the corresponding symbols $$\left(X_{n_{k_l}}, X_{n_{k_l}+1}, \ldots, X_{n_{k'_l}}\right)$$

of the samples of the reference signals of the group l, are contiguous symbols in the block of symbols, which is equivalent to $n_{k'_l} - n_{k_l}$ being equal to $k'_l - k_l$. The integer d is the minimum distance set between two groups. This enables to define 2.L groups of various sizes. Indeed, the corresponding symbols $X_{(n_i+M/2)}$, with i ∈ ⟦1;K⟧, are also set as groups of contiguous symbols. Having contiguous groups of corresponding symbols leads to increased robustness against interference both from non-reference signal symbols and multipath propagation. The more groups are defined the more the phase variations can be precisely tracked.

According to an aspect of the invention, the method further comprises determining:
- a positive integer d strictly greater than 1;
- the K integers $n_i$, with $i \in [\![1;K]\!]$ such as:

$$n_{i+1}-n_i \geq d$$

This enables to set K pairs of distributed reference signals. The integer d is the minimum distance set between the distributed reference signals whose corresponding symbols are in positions $n_i$ and $n_{i+1}$ with $i \in [\![1;K]\!]$. The more distributed reference signals are defined the more the phase variations can be precisely tracked.

According to an aspect of the invention, $n_K - n_1 = k-1$.

This enables to set all the reference signals inserted in the radio signal as two groups of K contiguous reference signals, reducing the interference between the samples of reference signals and the non-reference signals samples.

According to an aspect of the invention, the method further comprises:
determining a positive integer $K_{CP}$ such as $K_{CP} \leq \lfloor K/2 \rfloor$; wherein for each pair i such as $i \in [\![1;K_{CP}]\!]$, a value $\rho_{n_i}$, such as the samples in the radio signal that are obtained from the symbol $X_{n_i}$ whose value is set to $\rho_{n_i}$ are equal to the samples of the first reference signal of pair i in the radio signal, is equal to a value $$\rho_{(n_i+K-K_{CP})},$$

such as the samples in the radio signal that are obtained from the symbol $$X_{(n_i+K-K_{CP})}$$

whose value is set to $$\rho_{(n_i+K-K_{CP})}$$

are equal to the samples of the first reference signal of pair $i+K-K_{CP}$ in the radio signal; and/or
a value $\rho_{(n_i+M/2)}$, such as the samples in the radio signal that are obtained from the symbol $X_{(n_i+M/2)}$, whose value is set to $\rho_{(n_i+M/2)}$ are equal to the samples of the second reference signal of pair i in the radio signal, is equal to a value $$\rho_{(n_i+K-K_{CP}+M/2)},$$

such as the samples in the radio signal that are obtained from the symbol $$X_{(n_i+K-K_{CP}+M/2)}$$

whose value is set to $$\rho_{(n_i+K-K_{CP}+M/2)}$$

are equal to the samples of the second reference signal of pair $i+K-K_{CP}$ in the radio signal.

In case of contiguous reference signals setting the corresponding value $\rho_{n_i}$ as is equal to the corresponding value $$\rho_{n_{i+K-K_{CP}}}$$

enables creating a cyclic prefix within the group of reference signals. Therefore, it is easier to process the reference signals when interference occurs between the samples of the group of reference signals and the non-reference signals samples due to, for example, multipath propagation.

In case of pre-DFT insertion, this embodiment is identical to setting the value of $X_{n_i}$ and the value of $$X_{n_{i+K-K_{CP}}}$$

to me same value.

The same can be applied to $$X_{(n_i+M/2)} \text{ and } X_{(n_i+K-K_{CP})}.$$

According to an aspect of the invention, the value $\rho_{n_i}$, such as the samples in the radio signal that would be obtained from the symbols $X_{n_i}$ whose value is set to $\rho_{n_i}$ are equal to the samples of the first reference signal of pair i in the radio signal, is a component of a CAZAC sequence; and/or
wherein a value $\rho_{(n_i+M/2)}$, such as the samples in the radio signal that would be obtained from the symbol $X_{(n_i+M/2)}$ whose value is set to $\rho_{(n_i+M/2)}$ are equal to the samples of the second reference signal of pair i in the radio signal, is a component of a CAZAC sequence.

This enables to distinguish overlapping samples of two reference signals more efficiently. For example the samples corresponding to $X_{n_i}$ and the samples corresponding to $X_{(n_i+M/2)}$ are emitted in the same time periods, therefore by defining the corresponding values $\rho_{n_i}$ and $\rho_{(n_i+M/2)}$ as components of a CAZAC sequence it is more efficient to distinguish and process each reference signals.

In case of pre-DFT insertion, this embodiment is identical to setting the values of the symbols $X_{n_i}$, with $\{n_i | i \in [\![1;K]\!]\}$, as a component of a CAZAC sequence and/or to setting the values of the symbols $X_{(n_i+M/2)}$, with $\{n_i | i \in [\![1;K]\!]\}$, as a component of a CAZAC sequence.

It is advantageous to set all the corresponding values $\rho_{n_i}$ and $\rho_{(n_i+M/2)}$ to components of a same CAZAC sequence.

According to an aspect of the invention, the CAZAC sequence is a Zadoff-Chu sequence.

Zadoff-Chu sequences are specific CAZAC sequences which are more efficient in distinguishing each reference signals.

In another example, the corresponding values $\rho_{n_i}$ and $\rho_{(n_i+M/2)}$ are set to known modulation symbols from the digital modulation scheme used to obtain the data from the block of symbols.

According to an aspect of the invention, for each pair i, a value $\rho_{n_i}$, such as the samples in the radio signal that are obtained from the symbol $X_{n_i}$ whose value is set to $\rho_{n_i}$ are equal to the samples of the first reference signal of pair i in the radio signal, is equal to a value $\rho_{(n_i+M/2)}$, such as the samples in the radio signal that are obtained from the symbol $X_{(n_i+M/2)}$ whose value is set to $\rho_{(n_i+M/2)}$ are equal to the samples of the second reference signal of pair i in the radio signal. That is the corresponding values $\rho_{n_i}$ of the samples of the first reference signal are respectively equal to the corresponding values $\rho_{(n_i+M/2)}$ of the samples of the second reference signal.

This enables to efficiently distinguish and process the reference signals at the receiver side, since at the output of the M size DFT the common value of $X_{n_i}$ and $X_{(n_i+M/2)}$ only contributes to values $S_0, S_2, \ldots, S_{2k}, \ldots S_M$ of vector S. Therefore, on the first transmit antenna, only one out of two occupied subcarriers (0-th, $2^{nd}$, etc.) ($S^{Tx1}_{2k}$) carry information relative to the reference signals, while on the second transmit antenna, only the other one out of two occupied subcarriers (1st, 3rd, etc.) ($S^{Tx2}_{2k+1}$) carry information relative to the reference signals.

In case of pre-DFT insertion, this embodiment is identical to setting for each pair i the value of the symbol $X_{n_i}$ equal to the value of the symbol $X_{(n_i+M/2)}$.

According to an aspect of the invention, a maximum module among the modules of values $\rho_{n_i}$ and $\rho_{(n_i+M/2)}$ with $i \in [\![1;K]\!]$, each $\rho_{n_i}$, respectively $\rho_{(n_i+M/2)}$, such as for the samples in the radio signal that are obtained from the symbol $X_{n_i}$, respectively $X_{(n_i+M/2)}$, whose value is set to $\rho_{n_i}$, respectively $\rho_{(n_i+M/2)}$, are equal to the samples of the first reference signal of pair i, respectively the second reference signal of pair i, in the radio signal, is equal to or smaller than a maximum module among modules of modulation symbols of a digital modulation scheme used to obtain said block of symbols.

This enables to insert reference signal without increasing the PAPR. As mentioned, above the single carrier property is preserved by inserting the reference signals according to the invention, moreover setting the corresponding values taking into account the maximum module of the digital modulation scheme, ensures to preserve the level of the peak to average power ratio.

In case of pre-DFT insertion, this embodiment is identical to setting the value of the symbol $X_{n_i}$ and the value of symbol $X_{(n_i+M/2)}$, such as the modules of these values are equal or smaller than the maximum module of all modulation symbols of a digital modulation scheme used to obtain the block of symbols.

In yet another example, all values $\rho_{n_i}$ and $\rho_{(n_i+M/2)}$ with $i \in [\![1;K]\!]$, such as for the samples in the radio signal that are obtained from the symbol $X_{n_i}$, respectively $X_{(n_i+M/2)}$, whose value is set to $\rho_{n_i}$, respectively $\rho_{(n_i+M/2)}$, are equal to the samples of the first reference signal of pair i, respectively the second reference signal of pair i, in the radio signal, are set such as their module is equal to the maximum module among modules of modulation symbols of a digital modulation scheme used to obtain said block of symbols.

This enables to maximize the energy of the reference signals without increasing the PAPR.

A second aspect of the invention concerns a computer program product comprising code instructions to perform the method as described previously when said instructions are run by a processor.

A third aspect of the invention concerns a device for inserting K pairs of a first and a second Reference Signals in a radio signal to be transmitted over a wireless communication system, said radio signal being intended to be emitted by an emitter comprising at least two transmit antennas, each antenna being configured for transmitting on at least an even number M, strictly greater than 4, of different frequencies, and K being a strictly positive strictly smaller than M/2, said radio signal being processed by:

applying a M size DFT to a block of symbols $X = (X_0, \ldots X_{M-1})$, and obtaining for each $k^{th}$ frequency, with k=0 to M−1, a complex symbol $S_k$ in the frequency domain;

obtaining, at an output of an IDFT module corresponding to a first transmit antenna, during a given time interval a first signal representing, in the frequency domain, the complex symbols $S_k$ for each $k^{th}$ frequency with k=0 to M−1;

obtaining, at an output of an IDFT module corresponding to a second transmit antenna, during the given time interval a signal representing, in the frequency domain, the complex symbol $(-1)^{k+1} \varepsilon S^*_{(p-1-k)[M]}$ for each $k^{th}$ frequency, with k=0 to M−1 and p a predefined even integer lower or equal to M−1 and higher or equal to 0 and $\varepsilon$ is 1 or −1 and $S_k^*$ being the complex conjugate of $S_k$;

emitting the radio signal corresponding to the first and second signal; said device being configured to:

determine K integers such as $$\left\{ n_i | i \in [\![1;K]\!], 0 \leq n_i \leq \frac{M}{2} - 1, \forall i,j \in [\![1;K]\!]^2, i<j \Rightarrow n_i < n_j \right\};$$

and for each pair i of first and second Reference Signals:

insert the first Reference Signal in the radio signal, such as high energy samples of the first Reference Signal are in time periods in the radio signal, said time periods being dependent on a position $n_i$ of the symbol $X_{n_i}$ in the block of symbols;

insert the second Reference Signal in the radio signal, such as high energy samples of the second Reference Signal are in time periods in the radio signal, said time periods being dependent on the position $n_i+M/2$ of the symbol $X_{(n_i+M/2)}$ in the block of symbols.

A fourth aspect of the invention concerns A method for extracting K pairs of a first and a second Reference Signals in a radio signal received over a wireless communication system, said radio signal being emitted by an emitter comprising at least two transmit antennas, each antenna being configured for transmitting on at least an even number M, strictly greater than 4, of different frequencies, and K being a strictly positive integer strictly smaller than M/2, the emission of the radio signal being processed by:

applying a M size DFT to a block of symbols $X = (X_0, \ldots X_{M-1})$, and obtaining for each $k^{th}$ frequency, with k=0 to M−1, a complex symbol $S_k$ in the frequency domain;

obtaining, at an output of an IDFT module corresponding to a first transmit antenna, during a given time interval a first signal representing, in the frequency domain, the complex symbols $S_k$ for each $k^{th}$ frequency with k=0 to M−1;

obtaining, at an output of an IDFT module corresponding to a second transmit antenna, during the given time interval a signal representing, in the frequency domain, the complex symbol $(-1)^{k+1} \varepsilon S^*_{(p-1-k)[M]}$ for each $k^{th}$ frequency with k=0 to M−1 and p a predefined even integer lower or equal to M−1 and higher or equal to 0 and $\varepsilon$ is 1 or −1 and $S_k^*$ being the complex conjugate of $S_k$;

emitting the radio signal corresponding to the first and second signal; said first and second reference signals being inserted in the radio signal by:

determining K integers such as $$\{n_i | i \in [\![1; K]\!], 0 \le n_i \le \frac{M}{2} - 1, \forall i, j \in [\![1; K]\!]^2, i < j \Rightarrow n_i < n_j\};$$

and for each pair i of first and second Reference Signals:
inserting the first Reference Signal in the radio signal, such as high energy samples of the first Reference Signal are in time periods in the radio signal, said time periods being dependent on a position $n_i$ of the symbol $X_{n_i}$ in the block of symbols;
inserting the second Reference Signal in the radio signal, such as high energy samples of the second Reference Signal are in time periods in the radio signal, said time periods being dependent on the position $n_i$+M/2 of the symbol $X_{(n_i+M/2)}$ in the block of symbols;
said method comprising for at least one pair i of first and second
Reference Signals:
extracting, before applying DFT modules on the received radio signal, parts of the radio signal, each part being received in one time window among time windows, said time windows being strictly included in the given time interval; processing said extracted parts independently from other parts of the received radio signal.

According to an aspect of the invention, each time window among the time windows strictly includes at least one time period among the time periods. Alternatively, each time window is strictly included in at least one time period among the time periods. Alternatively, each time window is equal to one time period among the time periods.

In the case of a radio signal provided according to the specific scheme and reference signal inserted according to the invention, this enables to extract parts of the radio signal, received on each receiving antennas, which contain information representative of the reference signals. More precisely the method enables to extract parts of the radio signal that contains information relative to the transmitted reference signals, in the time domain, without extracting parts of the radio signal that contains information relative to samples of non-reference signals, or at the most extracting only parts of the radio signal that contains residual information relative to the samples of non-reference signals.

This extraction is implemented in the time domain on the received radio signal, that is before applying the DFT modules associated with each receive antennas Rx1, . . . RxQ, regarding the FIG. 4.3.

For any emission at the transmitter side that occurs in a given time period there is a corresponding time period at the receiver side during which the received signal is representative of the information transmitted at the transmitter side in the given time period. With respect to a fixed time reference, there is a time difference between the beginning of the given time period at the transmitter side and the beginning of the corresponding time period at the receiver side, accounting for e.g., propagation delays and/or hardware effects. In the following, to clarify the explanations, we will consider that given time period at the transmitter side and the corresponding time period at the receiver side are understood with respect to relative time references which are the beginning of the emission respectively the reception of the data block of symbol. Therefore, given time period at the transmitter side and the corresponding time period at the receiver side are identical or at least similar.

The samples extracted are the received samples of the corresponding symbols $X_{n_i}$ and corresponding symbols $X_{(n_i+M/2)}$, with $i \in [\![1;K]\!]$, these samples being received on each antennas of the receiver. Therefore, the parts of the received radio signal which are extracted lie in time domain windows that encompass at least part of those time periods (at the receiver side) corresponding to the time periods dependent to the positions $n_i$ and/or $n_i$+M/2.

These time periods are determined relatively to the begging of the receiving of the bloc of symbols, as it is commonly done in a receiver.

Therefore, the time periods during which the radio signal is extracted are identical or at least similar than the time periods dependent to the position $n_i$ and/or $n_i$+M/2, thus these time periods are not distinguished, and it will be indifferently be referred to them as time periods, corresponding time periods or time periods dependent to the position $n_i$ and/or $n_i$+M/2.

A system comprising a transmitter with an inserting device as previously described and a receiver with an extracting device as previously described may be directly deduced from the application.

After extraction, the received samples of the reference signal are processed. The processing can be made independently from the received samples of non-reference signals. The processing scheme applied to the received samples of the reference signals is based on classical algorithms allowing estimating various parameters when reference signals with values and positions known by the receiver are transmitted from a transmitter.

Once processed the receiver may evaluate channel perturbation which impacts the radio signal. For example the receiver may deduce phase estimation which may enable to improve channel estimation or directly deduce the channel estimation. According to the channel estimation the decoding modules may be set to compensate the corruption (phase shift, amplitude . . . ) of the signal in the channel between transmitter and receiver.

A fifth aspect of the invention concerns a device for extracting K pairs of a first and a second Reference Signals in a radio signal received over a wireless communication system, said radio signal being emitted by an emitter comprising at least two transmit antennas, each antenna being configured for transmitting on at least an even number M, strictly greater than 4, of different frequencies, and K being a strictly positive integer strictly smaller than M/2, the emission of the radio signal being processed by:
applying a M size DFT to a block of symbols X= $(X_0, \ldots X_{M-1})$, and obtaining for each $k^{th}$ frequency, with k=0 to M−1, a complex symbol $S_k$ in the frequency domain;
obtaining, at an output of an IDFT module corresponding to a first transmit antenna, during a given time interval a signal representing, in the frequency domain, the complex symbols $S_k$ for each $k^{th}$ frequency with k=0 to M−1;
obtaining, at an output of an IDFT module corresponding to a second transmit antenna, during the given time interval a signal representing, in the frequency domain, the complex symbol $(-1)^{k+1} \varepsilon S^*_{(p-1-k)}$ for each $k^{th}$ frequency with k=0 to M−1 and p a predefined even integer lower or equal to M−1 and higher or equal to 0 and ε is 1 or −1 and $S_k^*$ being the complex conjugate of $S_k$;
emitting the radio signal corresponding to the first and second signal; said first and second reference signals being inserted in the radio signal by:

determining K integers such as $$\{n_i | i \in [\![1; K]\!], 0 \le n_i \le \frac{M}{2} - 1, \forall i, j \in [\![1; K]\!]^2, i < j \Rightarrow n_i < n_j\};$$

and for each pair i of first and second Reference Signals:
inserting the first Reference Signal in the radio signal, such as high energy samples of the first Reference Signal are in time periods in the radio signal, said time periods being dependent on a position $n_i$ of the symbol $X_{n_i}$ in the block of symbols;
inserting the second Reference Signal in the radio signal, such as high energy samples of the second Reference Signal are in time periods in the radio signal, said time periods being dependent on the position $n_i+M/2$ of the symbol $X_{(n_i+M/2)}$ in the block of symbols;
for at least one pair i of first and second Reference Signals, said device being configured to:
extract, before applying DFT modules on the received radio signal, parts of the radio signal, each part being received in one time window among time windows, said time windows being strictly included in the given time interval;
process said extracted parts independently from other parts of the received radio signal.

The present invention is illustrated by way of example, and not by way of limitation, in the figures of the accompanying drawings, in which like reference numerals refer to similar elements.

BRIEF DESCRIPTION OF DRAWINGS

FIG. 3.1 schematizes a block diagram of a PAPR-preserving SFBC transmitter.
FIG. 3.2 details the PAPR-preserving SFBC logical functioning.
FIG. 3.3 schematizes an equivalent block diagram of a PAPR-preserving SFBC transmitter.
FIG. 3.4 schematizes a block diagram of a PAPR-preserving SFBC receiver.
FIG. 4.1 schematizes a block diagram of Pre-DFT insertion of RS according to the invention.
FIG. 4.2 schematizes a block diagram of Post-IDFT insertion of RS according to the invention.
FIG. 4.3 schematizes a block diagram of RS extraction and DATA decoding according to the invention.
FIG. 5.1 illustrates a flowchart representing the steps of pre-DFT inserting reference signals in the radio signal according to the invention.
FIG. 5.2 illustrates a flowchart representing the steps of post-IDFT inserting reference signals in the radio signal according to the invention.
FIG. 5.3 illustrates a flowchart representing the steps of extracting reference signals in the radio signal according to the invention.

DESCRIPTION OF EMBODIMENTS

Figure 1:
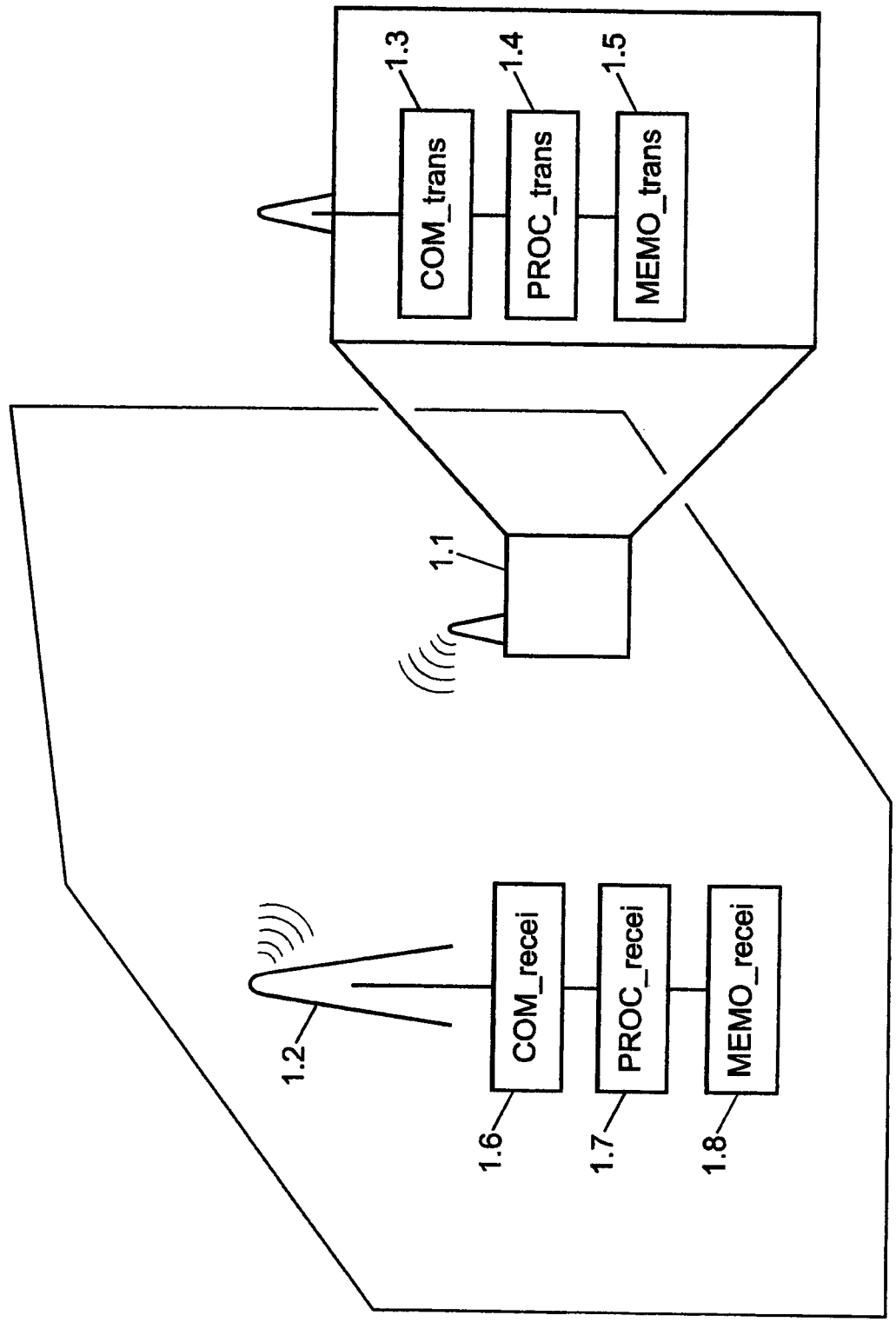
FIG. 1 illustrates a SC-SFBC type transmitter and receiver.

Referring to FIG. 1, there is shown a transmitter 1.1 transmitting a radio signal to a receiver 1.2. The transmitter 1.1 is in the cell of the receiver 1.2. This transmission may be a SC-SFBC based transmission in the context of OFDM based system. In this example the transmitter 1.1 is a mobile terminal and the receiver 1.2 is a fixed station which in the context of LTE is a base station. The transmitter 1.1 can as well be the fixed station and the receiver 1.2 a mobile terminal.

The transmitter 1.1 comprises one communication module (COM_trans) 1.3, one processing module (PROC_trans) 1.4 and a memory unit (MEMO_trans) 1.5. The MEMO_trans 1.5 comprises a non-volatile unit which retrieves the computer program and a volatile unit which retrieves the reference signal parameters. The PROC_trans 1.4 which is configured to insert the reference signals according to the invention. The COM_trans is configured to transmit to the receiver 1.2 the radio signal. The processing module 1.4 and the memory unit 1.5 may constitute the device for inserting the reference signals, as previously described. The processing module 1.4 and the memory unit 1.5 can be dedicated to this device or also used for other functions of the transmitter like for processing the radio signal.

The receiver 1.2 comprises one communication module (COM_recei) 1.6, one processing module (PROC_recei) 1.7 and a memory unit (MEMO_recei) 1.8. The MEMO_recei 1.8 comprises a non-volatile unit which retrieves the computer program and a volatile unit which retrieves the reference signal parameters. The PROC_recei 1.7 is configured to extract the reference signals from the radio signal. The COM_recei 1.6 is configured to receive from the transmitter the radio signal. The processing module 1.7 and the memory unit 1.8 may constitute the device for extracting the reference signals, as previously described. The processing module 1.7 and the memory unit 1.8 can be dedicated to this device or also used for other functions of the receiver like for processing the receiving scheme on the radio signal.

Figure 2:
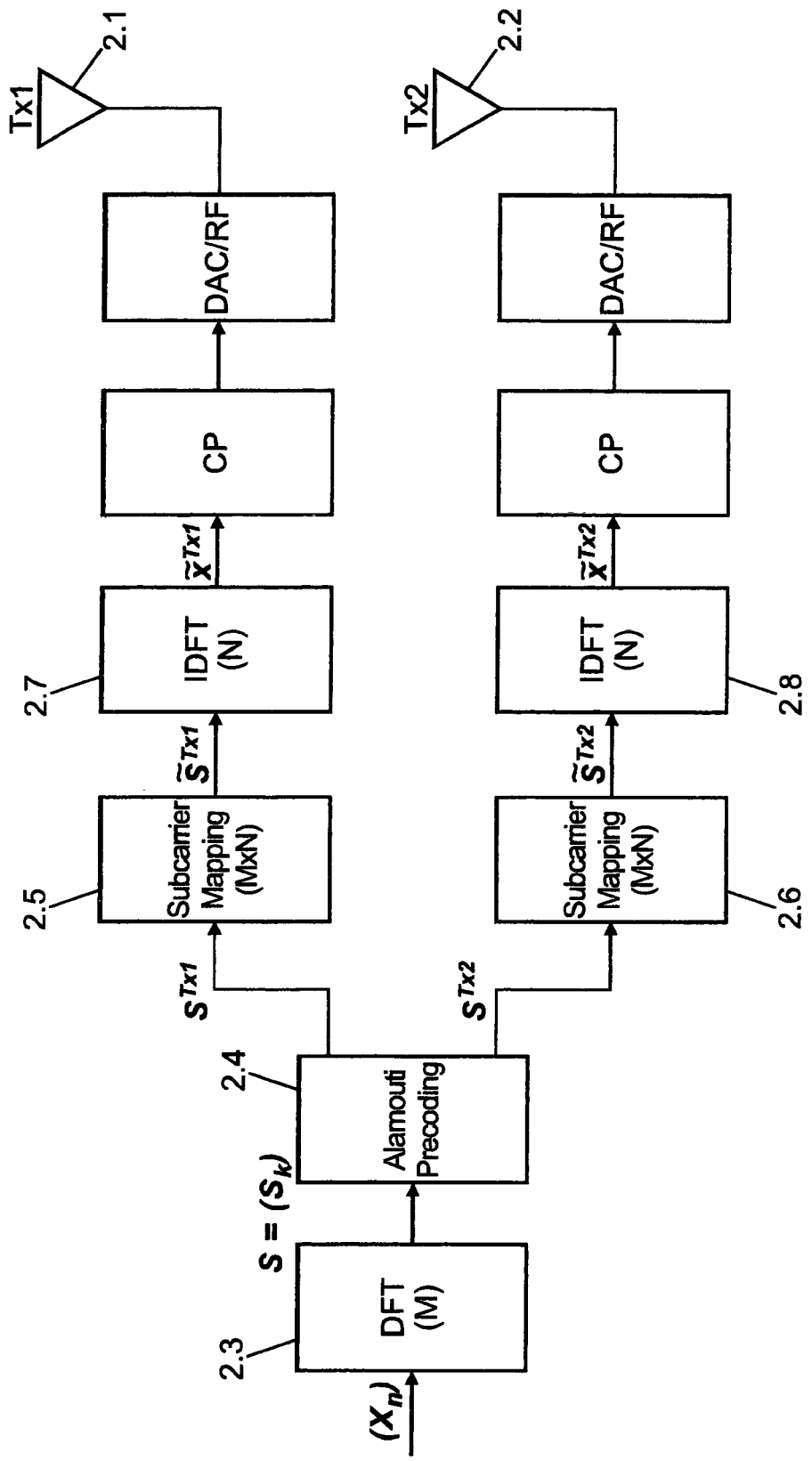
FIG. 2 schematizes a block diagram of a classical SFBC transmitter.

Referring to FIG. 2, there is shown a block diagram of a classical SFBC transmitter. Such SFBC transmitters apply Alamouti precoding on the bases of a DFTsOFDM system. This ensures full diversity for a rate of one symbol per channel use. An SFBC transmitter emits a radio signal by emitting on at least two transmit antennas Tx1 2.1 and Tx2 2.2.

The radio signal being provided by applying a M size DFT 2.3 to a block of symbols $X=(X_0, \ldots X_{M-1})$, for example a block of symbols obtained by a QPSK digital modulation scheme or any other digital modulation scheme as QAM. M is the number of allocated subcarriers. In such SFBC scheme, M is even.

Therefore, in the frequency domain, the DFT 2.3 outputs M complex symbols $\{S_k\}$, (k=0 to M−1) one complex symbol for each k-th subcarrier among the M allocated subcarriers. The vector $S=(S_0, \ldots S_{M-1})$ represents the M-point DFT of the block of modulation symbols X.

The "Alamouti pre-coding" 2.4 is applied to adjacent subcarriers in DFTsOFDM. That is for each M/2 pairs $(S_k; S_{k+1})$ formed by the M outputs of the DFT of the same data block with k even (0 included) the Alamouti pre-coding is applied with the pre-coding matrix:

$$\begin{bmatrix} S_k & -S_{k+1}^* \\ S_{k+1} & S_k^* \end{bmatrix}$$

where symbols on $1^{st}$ and respectively $2^{nd}$ column represent the symbols transmitted from antennas Tx1 and respectively Tx2, and symbols on $1^{st}$ and respectively 2$^{nd}$ row represent symbols to be transmitted onto the k-th and respectively (k+1)-th allocated subcarriers.

Therefore the outputs of the Alamouti pre-coding 2.4 are the vectors $S^{Tx1}$ and $S^{Tx2}$, with:

$$S^{Tx1}=(S^{Tx1}{}_k)=(S_k)$$

$$S^{Tx2}=(S^{Tx2}{}_k)=((-1)^{k+1}S^*{}_{k+(-1)^k})$$

Each vector is mapped to the M allocated subcarriers out of N existing subcarriers via subcarrier mapping modules 2.5 and 2.6. The subcarrier mapping can be for example localized, that is the M elements of each vector $S^{Tx1,2}$ are mapped to M consecutive subcarriers among the N existing. The subcarrier mapping can be for example distributed, that is the M elements of each vector $S^{Tx1,2}$ are mapped equally distanced over the entire bandwidth with zero occupying the unused subcarriers. Inverse DFT of size N 2.7 and 2.8 are then applied to the two resulting vectors $\tilde{S}^{Tx1}$ and $\tilde{S}^{Tx2}$, therefore generating two DFTsOFDM symbols, to be sent in the same time from the two transmit antennas. A cyclic prefix can be optionally appended after IDFT.

The output of each IDFT is emitted on each antenna, the output of the IDFT 2.7, applied on $\tilde{S}^{Tx1}$, is emitted on Tx1 2.1 and the output of the IDFT 2.8, applied on $\tilde{S}^{Tx2}$, is emitted on Tx2 2.2. Such a SFBC scheme breaks the PAPR property of the signal transmitted on the second transmit antenna. To preserve the PAPR property evolved SFBC schemes have been developed.

Referring to FIG. 3.1, there is shown a block diagram of a PAPR-preserving SFBC transmitter also called SC-SFBC. Such transmitters apply also an Alamouti pre-coding at subcarrier level, after an M sized DFT. In contrary to a classical SFBC scheme of FIG. 2, a PAPR-preserving SFBC 3.1.4 applies Alamouti pre-coding to non-adjacent subcarriers, more precisely Alamouti pre-coding is applied to each pairs of symbols $(S_k; S_{(p-1-k)[M]})$ of the M outputs of the DFT 3.1.3 of the same data block, and mapped onto subcarriers k-th and (p-1-k)[M]-th allocated subcarriers, where p is an even integer. Usually p is chosen close to M/2 (that is minimizing |M/2-p|) to minimize the maximum distance between pairs of subcarriers k and (p-1-k)[M]. This PAPR-preserving SFBC logical functioning will be explained more precisely in FIG. 3.2.

Besides this specific applying of the "Alamouti pre-coding" 3.1.4, the PAPR-preserving SFBC scheme is identical to a SFBC scheme. Therefore, the outputs of the specific Alamouti pre-coding 3.1.4, that is the PAPR preserving SFBC module 3.1.4, are the vectors $S^{Tx1}$ and $S^{Tx2}$ on which we apply subcarrier mapping modules 3.1.5 and 3.1.6. These vectors are mapped to the M allocated subcarriers out of N existing subcarriers. The vectors $\tilde{S}^{Tx1}$ and $\tilde{S}^{Tx2}$ respectively resulting from the subcarrier mapping 3.1.5 associated to antenna Tx1 3.1.1 and the subcarrier mapping 3.1.6 associated to antenna Tx2 3.1.2, are inputted in the respective N size IDFT associated with each antenna 3.1.7 and 3.1.8. The same subcarrier mapping is usually applied to signals intended for both transmit antennas.

Referring to FIG. 3.2 there is shown in detail the logical functioning of a PAPR-preserving SFBC module 3.1.4.

The vector $S=(S_k)$, which represents the (output of the) M-point DFT of the block of modulation symbols X, is inputted in the PAPR preserving SFBC module 3.1.4. For each pair $(S_k; S_{(p-1-k)[M]})$ of the allocated subcarriers k and (p-1-k)[M], the PAPR preserving SFBC applies the matrices:

$$A^{(I)} = \begin{bmatrix} S_k & -S^*_{(p-1-k)[M]} \\ S_{(p-1-k)[M]} & S^*_k \end{bmatrix}$$

when k is even and $$A^{(II)} = \begin{bmatrix} S_k & S^*_{(p-1-k)[M]} \\ S_{(p-1-k)[M]} & -S^*_k \end{bmatrix}$$

when k is odd.

Note that changing the sign (+/−) of the signal related to the second antenna does not change the method.

For both matrices symbols on 1$^{st}$ and respectively 2$^{nd}$ column represent the symbols transmitted from antennas Tx1 and respectively Tx2, and symbols on 1$^{st}$ and respectively 2$^{nd}$ row represent symbols to be transmitted onto the k-th and respectively (p-1-k)[M]-th allocated subcarriers. Therefore the outputs of the PAPR preserving SFBC 3.1.4 is the vector $S^{Tx1}$ related to antenna Tx1 3.1.7 and $S^{Tx2}$ related to antenna Tx2 3.1.8, with:

$$S^{Tx1}=(S^{Tx1}{}_k)=(S_k)$$

$$S^{Tx2}=(S^{Tx2}{}_k)=\varepsilon((-1)^{k+1}S^*{}_{(p-1-k)[M]})$$

With ε the value 1 or −1. When not stated otherwise, in the following we consider ε=1. Indeed changing the sign (+/−) of the signal related to the second antenna does not change the method.

Such PAPR preserving SFBC transmitter is equivalent to sending to two independent transmit antennas, in the same time interval representing the duration of a DFTsOFDM symbol, a DFTsOFDM symbol corresponding to the block of symbols $eqX^{Tx1}=(eqX^{Tx1}{}_k)=(X_k)$ on the first transmit antenna and a DFTsOFDM symbol corresponding to the block of symbols $eqX^{Tx2}=(eqX^{Tx2}{}_k)=(e^{j2\pi(p-1)k/M}X^*_{(k+M/2)[M]})$ on the second transmit antenna, as shown in FIG. 3.3. This equivalence is shown in the literature (Cristina Ciochina et al.: "Single-Carrier Space-Frequency Block Coding: Performance Evaluation", Vehicular Technology Conference, 2007. VTC-2007 Fall. 2007 IEEE 66th, IEEE, P1, Sep. 1, 2007, pp. 715-719). Since the PAPR of $eqX^{Tx1}{}_k$ is equal to the PAPR of $eqX^{Tx2}{}_k$ the signal sent on Tx1 and on Tx2, obtained through DFTsOFDM modulation applied respectively to the symbol blocks $eqX^{Tx1}$ and $eqX^{Tx2}$, have the same PAPR. Thus both have SC-type envelope fluctuations, leading to low PAPR. Therefore, a PAPR-preserving SFBC system preserves the single carrier property or the PAPR property.

Referring to FIG. 3.4, there is shown a block diagram of a PAPR-preserving SFBC receiver. Such a receiver is configured to decode a radio signal emitted by a PAPR-preserving SFBC. This example shows 2 receive antennas but such receiver can have only one antenna (MISO) or more antennas (MIMO). In this example said radio signal is received on two antennas Rx1 3.4.1 and Rx2 3.4.2. The radio signal received by each antennas differs, and the more the two antennas are spaced from each other the more the radio signal received on each antennas is likely to be different, which introduces receive diversity. After an optional guard removal the resulting $\hat{y}^{Rx1}$ and $\hat{y}^{Rx2}$ are inputted into two N size DFT (3.4.3 and 3.4.4) and then in subcarriers de-mapping modules (3.4.5 and 3.4.6), one associated to Rx1 3.4.1 one associated with Rx2 3.4.2. The result in the frequency domain is two vectors $T^{Rx1}$ and $T^{Rx2}$. Before inputting $T^{Rx1}$ and $T^{Rx2}$ in the PAPR preserving SFBC de-combiner 3.4.8, the PAPR preserving SFBC de-combiner 3.4.8 can be adjusted based on the channel estimation, channel estimation which is computed for example on the basis of received DMRS (demodulation reference signal). Afterwards, the $T^{Rx1}$ and $T^{Rx2}$ are inputted in the PAPR preserving SFBC de-combiner 3.4.8 which outputs one M-size vector T. A M size DFT is applied to T to obtain a block of symbols $Y=(Y_k)$ in the time domain. The vector Y once completely decoded, that is for example after constellation de-mapping and error correction, enables estimating the digital data at the origin of X.

If reference signals are pre-DFT inserted in random position and multiplexed with the data modulation symbols at the DFT input, the samples of the reference signals received cannot be extracted from the received signal and processed before obtaining at first vector Y at the output of the IDFT module 3.4.9. Therefore, the Alamouti de-combining 3.4.8 will de-combine $T^{Rx1}$ and $T^{Rx2}$ without taking into account the information conveyed by the reference signals, which can lead to strongly degraded performance of the Alamouti decombining module 3.4.8.

Referring to FIG. 4.1, there is shown a block diagram of Pre-DFT insertion of reference signals according to the invention. Regarding the transmitter, the scheme applied is the same than the PAPR-preserving SFBC scheme described in FIGS. 3.1 and 3.2. Therefore, a M size DFT 4.1.3, a PAPR preserving SFBC pre-coder 4.1.4, subcarrier mapping modules 4.1.5 and 4.1.6 and N size IDFT modules are successively applied to the block of symbols $X=(X_0, \ldots X_{M-1})$ to obtain the radio signal emitted by Tx1 4.1.1 and Tx2 4.1.2.

In this embodiment, reference signal are inserted pre-DFT, that is by setting values of the symbols $X_n$ which are chosen to be reference signals. Therefore, when inserting 2K reference signals, K being a positive integer smaller or equal to M/2 (it may be set strictly smaller than M/2 to avoid the block of symbols X to be a full block of reference signals), K integers $n_i$ are to be determined such as $$\{n_i | i \in [\![1; K]\!], 0 \le n_i \le \frac{M}{2} - 1, \forall i, j \in [\![1; K]\!]^2, i < j \Rightarrow n_i < n_j\}.$$

Then reference signals are inserted directly in the block of symbol X at the positions $n_i$ and $n_i+M/2$. The RS insertion module 4.1.9 inserts the reference signals by setting each value of the symbols $X_n$ which are at positions $n_i$ or $n_i+M/2$ with $i \in [\![1;K]\!]$ at a value of a reference signal. The RS insertion module 4.1.9 may be configured in a static way by previously configuring the positions $n_i$ or $n_i+M/2$ with $i \in [\![1;K]\!]$. Several configurations may also be previously programmed, for example one configuration for each number K. Exact values of K and ni can be either fixed, or configurable. Configuration can be done in an implicit manner (based on other parameters known by the transmitter), or in an explicit manner (based on instructions that the receiver is returning to the transmitter via, e.g., a control channel). The Data modulator module 4.1.10 may be configured to insert modulation symbols into the block of symbols in positions that do not conflict with the positions $n_i$ or $n_i+M/2$ with $i \in [\![1;K]\!]$ of the reference signals. The RS insertion module 4.1.9 may inform the Data modulator module 4.1.10 of the chosen configuration.

The positions $$\{n_i | i \in [\![1; K]\!], 0 \le n_i \le \frac{M}{2} - 1, \forall i, j \in [\![1; K]\!]^2, i < j \Rightarrow n_i < n_j\}$$

can be advantageously chosen. For example, the RS insertion module 4.1.9 may be configured with the positions $n_i$ consecutive, that is with $n_K-n_1=K-1$. Grouping the RS on consecutive positions enables to reduce the interference of the RS with other symbols in the radio signal.

In another example, the positions $\{n_i | i \in [\![1;K]\!]\}$ of the RS can be divided in groups of consecutive positions. That is for example, 3 groups of RS of consecutive positions $n_1$ to $n_{k'_1}$, $n_{K_2}$ ($n_{k_2} \ne n_{k'_1}$) to $n_{k'_2}$ and $n_{k_3}$ ($n_{k_3} \ne n_{k'_2}$) to $n_k$, where $n_{k'_1}-n_1=k'_1-1$, $n_{k'_2}-n_{k_2}=k'_2-k_2$ and $n_k-n_{k_3}=K-k_3$. Having several groups which are separated by other symbols in the block of symbols X, enables to track fast phase variations at a lower level than the time duration of a block of symbol.

For the same reasons it may be advantageous to set the values of the positions on one extreme (or both extremes) of each group as protection. For example, by defining respectively the values of the symbols $$X_{n_{k'_1}}, X_{n_{k'_2}}, X_{n_K}$$

to the values of the symbols $$X_{n_1}, X_{n_{k_2}}, X_{n_{k_3}}.$$

Or by setting the values of the symbols $$X_{n_{k'_1}}, X_{n_{k'_2}}, X_{n_K}$$

to 0. The protection can be enhanced by defining more than the last symbol of the group as a protection symbol.

Regarding the values of the symbols $X_{n_i}$ and $X_{(n_i+M/2)}$ with $i \in [\![1;K]\!]$, that is the symbols of X positioned at $n_i$ and $n_i+M/2$ for $i \in [\![1;K]\!]$, they may be set as components of a CAZAC sequence. More specifically the values of the symbols $X_{n_i}$ with $i \in [\![1;K]\!]$ can be derived from values of a first CAZAC sequence and/or the values of the symbols $X_{(n_i+M/s)}$ with $i \in [\![1;K]\!]$ can be derived from values of a second CAZAC sequence. The CAZAC sequences may be for example Zadoff-Chu sequences. That is for example with the values of $X_{n_i}$ with $i \in [\![1;K]\!]$, can be set to the values of a CAZAC sequence of length K, or can be obtained by truncating a CAZAC sequence of length superior to K, or can be obtained by cyclic extension from a CAZAC sequence of length inferior to K.

It is advantageous to set equal values for $X_{n_i}$ and $X_{(n_i+M/2)}$ with $i \in [\![1;K]\!]$. Indeed, at the output of the DFT module 4.2.3 the common value of $X_{n_i}$ and $X_{(n_i+M/2)}$ only contributes to values $S_{2k}$ of vector S. Therefore, on the first transmit antenna, only one out of two occupied subcarriers (0-th, $2^{nd}$, etc) carry information ($S^{Tx1}_{2k}$) relative to the reference signals, while on the second transmit antenna, only the other one out of two occupied subcarriers (1st, 3rd, etc) carry information ($S^{Tx2}_{2k+1}$) relative to the reference signals. Therefore, the samples of reference signals received from each antenna are orthogonal to each other and thus enabling to distinguish samples of reference signals emitted by the first antenna and the ones emitted by the second antenna.

It is advantageous to set values for $X_{n_i}$ and $X_{(n_i+M/2)}$ with $i \in [\![1;K]\!]$, such as the maximum absolute values modules are equal or smaller than the maximum absolute values of the modulation symbols of the digital modulation scheme used for modulation. For example, the digital modulation scheme can be QPSK (quadrature phase-shift keying) or other PSK (phase-shift keying) whose values are all of module equal to 1, in this example the values of $|X_{n_i}|$ and $|X_{(n_i+M/2)}|$ are chosen as to be smaller or equal to 1.

Referring to FIG. 4.2, there is shown a block diagram of Post-IDFT insertion of reference signals according to the invention. In this embodiment, the reference signals are not inserted pre-DFT (that is by setting the values of the symbols $X_{n_i}$ and $X_{(n_i+M/2)}$ with $i \in [\![1;K]\!]$, to non-null values known by the receiver as shown in FIG. 4.1). The insertion of the reference signals is done post IDFT. For this, the data modulator module 4.2.1 is configured to set the values of the symbols $X_{n_i}$ and $X_{(n_i+M/2)}$ with $i \in [\![1;K]\!]$ to 0. The configuration of the data modulator module 4.2.1 may be made by the RS insertion module 4.2.2 which can send the position configuration to the data modulator module 4.2.1. On this incomplete block of symbols $X_{DATA}$, the same scheme of the previous embodiment of FIG. 4.1 is applied, starting by a M size DFT 4.2.3. At the respective IDFT outputs subsequent signals are obtained, that is $\tilde{x}_{DATA}^{Tx1}$ at the output of the IDFT related to the antenna Tx1 and $\tilde{x}_{DATA}^{Tx2}$ at the output of the IDFT related to the antenna Tx2. The RS insertion module 4.2.2 adds respectively to each of the output signals of the IDFT modules (4.2.4 and 4.2.5), which are $\tilde{x}_{DATA}^{Tx1}$ corresponding to the antenna Tx1 and $\tilde{x}_{DATA}^{Tx2}$ corresponding to the antenna Tx2, the signals $\tilde{x}_{RS}^{Tx1}$ and the signal $\tilde{x}_{RS}^{Tx2}$ respectively. The signal $\tilde{x}_{RS}^{Tx1}$ and $\tilde{x}_{RS}^{Tx2}$ are pre-computed samples of the corresponding symbols $X_{n_i}$ and $X_{(n_i+M/2)}$ with $i \in [\![1;K]\!]$. That is rather than setting the pre-DFT values of the symbols $X_{n_i}$ and $X_{(n_i+M/2)}$ with $i \in [\![1;K]\!]$ in the block of symbol X, the samples of the reference signals are previously computed to obtain samples identical or at least equivalent to those that would have been obtain, at the output of the IDFT, by setting the values of the symbols $X_{n_i}$ and $X_{(n_i+M/2)}$ with $i \in [\![1;K]\!]$ to non-null values known by the receiver, as previously described. For example, the samples are obtained by applying the same scheme (SC-SFBC) to a block symbol where the values of the symbols $X_{n_i}$ and $X_{(n_i+M/2)}$ with $i \in [\![1;K]\!]$ are set respectively to the values representing the reference signals and setting the values of the other symbols to 0 (that is by not introducing other symbols). Therefore, when applying the same scheme to the incomplete block of symbols $X_{RS}$, at the output of the IDFT modules (4.2.4 and 4.2.5) we obtain $\tilde{x}_{RS}^{Tx1}$ and $\tilde{x}_{RS}^{Tx2}$ that are the samples in the signals outputted by the IDFT of the corresponding symbols $X_{n_i}$ and $X_{(n_i+M/2)}$ with $i \in [\![1;K]\!]$, pre-computed.

In the embodiments of the FIG. 4.2 where the reference signals are inserted post-IDFT the signals obtained at the output of the adders, $\tilde{x}^{Tx1}$ and $\tilde{x}^{Tx2}$, are equivalent to the signals at the outputs of the IDFT modules when pre-DFT inserting the reference signals. Therefore, all the features shown in relation with pre-DFT insertion can be applied to post-IDFT insertion.

For example, the positions advantageously chosen in pre-DFT insertion can be applied, by setting to 0 the symbols at those positions and then post-IDFT inserting in those positions the samples of the RS previously computed corresponding to those symbols.

In the embodiments that set the values of the symbols $X_{n_i}$ and $X_{(n_i+M/2)}$ with $i \in [\![1;K]\!]$, these embodiments can be applied in the case of post-IDFT insertion, by adding at the IDFT outputs the samples of the reference signals that have previously been computed with the incomplete block of symbols $X_{RS}$ in which the values of the symbols $X_{n_i}$ and $X_{(n_i+M/2)}$ with $i \in [\![1;K]\!]$ are the same as the corresponding values of the corresponding symbols $X_{n_i}$ and $X_{(n_i+M/2)}$ with $i \in [\![1;K]\!]$ set pre-DFT and all other symbols are set to 0.

Before adding the signal $\tilde{x}_{RS}^{Tx1}$ and the signal $\tilde{x}_{RS}^{Tx2}$, it is advantageous to filter the signals $\tilde{x}_{DATA}^{Tx1}$ and $\tilde{x}_{DATA}^{Tx2}$ to ensure that the samples in the signal $\tilde{x}_{DATA}^{Tx1}$ and the signal $\tilde{x}_{DATA}^{Tx2}$ of the corresponding symbols $X_{n_i}$ and symbols $X_{(n_i+M/2)[M]}$, whose values have been set to 0, are also strictly equal to 0 for the time periods in which are inserted the samples of the reference signal or at least time periods in which are inserted the parts of the samples of high energy. Therefore, this enables to reduce the interference of signals $\tilde{x}_{DATA}^{Tx1}$ and $\tilde{x}_{DATA}^{Tx2}$ onto at least the high energy part of signals $\tilde{x}_{RS}^{Tx1}$ and $\tilde{x}_{RS}^{Tx2}$.

Referring to FIG. 4.3, there is shown a block diagram of reference signals extraction according to the invention. The radio signal emitted according to the previous embodiments is received by the receiver 1.2, after having crossed a multipath channel and suffered noise and phase noise effects. The receiver can receive the radio signal on one antenna, which is the case in MISO telecommunication system, or on several antennas Rx1, Rx2 . . . RxQ as shown in FIG. 4.3.

After the Analogue to Digital converters (ADC) 4.3.1 have been applied to the radio signal received by each antenna, the reference signals are extracted. Here, by reference signal extraction we understand separating time domain portions of the received radio signal containing part or all of the information relative to the sent reference signals, corrupted by the channel and the noise/phase noise during the transmission process.

This is possible since in the time domain samples in the radio signal of the reference signals are superposed, for example when the samples in the radio signal of the reference signal corresponding to the symbols $X_{n_i}$ are emitted by Tx1 4.1.1 there are samples in the radio signal of the reference signal corresponding to the symbols $X_{(n_i+M/2)[M]}$ that are emitted by Tx2 4.1.2. This is shown by the fact that the PAPR preserving SFBC transmitter is equivalent to independently sending onto the two antennas signals obtained by applying DFTsOFDM scheme on each of the block of symbols:

$$eqX^{Tx1} = (eqX^{Tx1}_k) = (X_k)$$

$$eqX^{Tx2} = (eqX^{Tx2}_k) = (e^{j2\pi(p-1)k/M} X^*_{(k+M/2)[M]})$$

The symbol $eqX^{Tx1}_{n_i} = (X_{n_i})$ is processed at the same time than $eqX^{Tx2}_{n_i} = e^{j2\pi(p-1)n_i/M} X^*_{(n_i+M/2)[M]}$, the first symbol giving part of the samples in the radio signal of the reference signal corresponding to the symbols $X_{n_i}$ and the second one giving part of the samples in the radio signal of the reference signal corresponding to the symbols $X_{(n_i+M/2)[M]}$. Symmetrically, the symbol $eqX^{Tx1}_{n_i+M/2}$ and $eqX^{Tx2}_{n_i+M/2}$ are processed at the same time, these symbols giving respectively the other part of the samples in the radio signal of the reference signals corresponding to the symbols $X_{(n_i+M/2)[M]}$ and to the symbols $X_{n_i}$. Therefore, samples of the reference signals corresponding to the symbol $X_{n_i}$ and samples of the reference signals corresponding to the symbol $X_{(n_i+M/2)[M]}$ are emitted at the same time, that is at time periods being dependent to the position $n_i$ of the symbol $X_{n_i}$ and no parts of high energy of samples corresponding to symbol which are at other position than position $n_i$ are emitted at this same time, except for the samples corresponding to the symbol $X_{(n_i+M/2)}$.

Therefore, by extracting the parts of the signals outputted by the ADCs 4.3.1 during the time periods dependent to the position $n_i$, both the samples corresponding to the symbols $X_{n_i}$ and the samples corresponding to the symbols $X_{(n_i+M/2)[M]}$ are extracted. It is advantageous to take into account only the time periods corresponding to parts of the samples with high energy to avoid extracting unusable samples. These time periods depend on the type of subcarrier mapping that is implemented. For example a localized or a distributed implementation give completely different time periods.

Each type of subcarrier mapping has its own distribution, across the time domain, of the samples in the radio signal. These distribution are well known by the person skilled in the art and shown in the literature (for example: Cf. reference Hyung G. Myung Single Carrier Orthogonal Multiple Access Technique for Broadband WirelessCommunications Ph.D. Thesis Defense|2006 Dec. 18) which can easily transpose the teaching of the invention to other subcarrier mapping, thus the invention is not limited to a specific subcarrier mapping.

The extractor 4.3.2 may be configured to apply time-domain windows for extracting the reference signals according to the time periods of the received samples of the reference signals inserted (pre-DFT or post-DFT). A first configuration is to apply time domain windows, each window being equal to one time period among the time periods of the received samples of the reference signals. The sizes of the windows may as well exceed the size of the windows of the first configuration each window being positioned to include a window of the first configuration. This enables to extract a slightly wider part of the received samples corresponding to the reference signals which is advantageous when the receiver 1.2 is capable of interference mitigation. The size of the windows may be taken smaller than the size of the windows of the first configuration and each window may be positioned to be included in a window of the first configuration, enabling to limit the extraction of the received samples of non-reference signals which may cause interference with the samples of the reference signal, which is advantageous when the receiver 1.2 is of low performance regarding interference mitigation.

Once the received samples of the reference signals are extracted by the extractor 4.3.2 they may be time domain or frequency domain processed. The processing of the samples of the reference signals is a common processing well known by the person skilled in the art. For example, reference signals can serve as base for channel estimation through known channel estimation methods applied in the time or in the frequency domain. For example, reference signals can serve to improve the quality of a channel estimate acquired based on other dedicated reference signals (e.g. dedicated DFTsOFDM symbols carrying only reference symbols such as DMRS). The processing in the frequency domain is especially relevant in the case where the corresponding values of the samples corresponding to the symbols $X_{n_i}$ and $X_{(n_i+M/2)[M]}$ are equal, as previously mentioned. Once the received samples of the reference signal are processed, the channel estimation module 4.3.3 can compare these reference signals with reference values, as part of the channel estimation process.

The channel estimation may also result from a classical implementation with dedicated DMRS (demodulation reference signal) which occupy a full block of symbols, in this case the reference signal according to the invention can be used to improve the channel estimation quality.

Once the channel estimation module 4.3.3 calculated the estimated channel, the PAPR preserving SFBC de-combiner 4.3.4 may be set to compensate the corruption (phase shift, amplitude . . . ) of the signal in the channel between transmitter and receiver. Enabling to enhance the performance of the processing to obtain the block of symbols $Y=(Y_0, \ldots Y_{M-1})$.

The extractor 4.3.2 can also be placed after the guard removal modules.

Referring to FIG. 5.1 there is shown a flowchart representing the steps of pre-DFT inserting reference signals in a radio signal according to the invention.

At step S11 the RS insertion module 4.1.9 is configured either in a static way or dynamically, that is that the RS insertion module 4.1.9 is reconfigured depending for example on a feedback from the receiver through a control channel. In the case of a dynamic configuration the RS insertion module 4.1.9 may choose another configuration upon those saved in the MEMO_trans 1.5. Indeed, several configurations may be pre-parametred in the RS insertion module 4.1.9, those configurations can be ordered according to the number of reference signals the configuration provides. A configuration may be defined by the number of reference signals K, by the positions $n_i$ in the block of symbols X of the symbols $X_{n_i}$ to which corresponds the different reference signals to be inserted.

RS insertion module 4.1.9 may inform the Data modulator module 4.1.10 of the chosen configuration. Enabling the Data modulator module 4.1.10 to insert modulation symbols into the block of symbols in positions that do not conflict with the positions $n_i$ or $n_i+M/2$ with i $\in$ ⟦1;K⟧ of the reference signals.

At step S12 the RS insertion module 4.1.9, inserts the reference signals as previously described, by setting each value of the symbols $X_n$ which are at positions $n_i$ or $n_i+M/2$ with i $\in$ ⟦1;K⟧ at a value of a reference signal.

At step S13 the signal is processed, that is on the block of symbols $X=(X_0, \ldots X_{M-1})$ is applied a SC-SFBC-like scheme (DFT-PAPR preserving SFBC-subcarrier mapping-IDFT).

At step S14 the signal is emitted by Tx1 4.1.1 and Tx2 4.1.2.

Referring to FIG. 5.2 there is shown a flowchart representing the steps of post-IDFT inserting reference signals in a radio signal according to the invention.

At step S21 the RS insertion module 4.2.2 may also be configured in a static way or dynamically as in FIG. 5.1. Several configurations may also be pre-parametred in the RS insertion module 4.2.2, those configurations can be ordered according to the number of reference signals the configuration provides. A configuration may be defined by the number of reference signal K, by the positions n, in the block of symbols X of the symbols $X_{n_i}$ to which corresponds the different reference signals to be inserted. When configured, the RS insertion module 4.2.2 may inform the Data modulator module 4.2.1 of the configuration chosen.

At step S22, based on the configuration of the RS insertion module 4.2.2, the Data modulator module 4.2.1 sets the values of the symbols $X_{n_i}$ and $X_{(n_i+M/2)}$ with i $\in$ ⟦1;K⟧ to 0, as previously described in FIG. 4.2.

At step S23 the signal is processed, that is on the block of symbols $X=(X_0, \ldots X_{M-1})$, to which the values of the symbols $X_{n_i}$ and $X_{(n_i+M/2)}$ with i $\in$ ⟦1;K⟧ have been set to 0, is applied a SC-SFBC type scheme (DFT-PAPR preserving SFBC-subcarrier mapping-IDFT).

At step S24 the RS insertion module 4.2.2 adds respectively to each of the output signals of the IDFT modules (4.2.4 and 4.2.5), which are $\tilde{x}_{DATA}^{Tx1}$ corresponding to the antenna Tx1 4.2.6 and $\tilde{x}_{DATA}^{Tx2}$ corresponding to the antenna Tx2 4.2.7, the signal $\tilde{x}_{RS}^{Tx1}$ and the signal $\tilde{x}_{RS}^{Tx2}$. The signal $\tilde{x}_{RS}^{Tx1}$ and $\tilde{x}_{RS}^{Tx2}$ are pre-computed based on the symbols $X_{n_i}$ and $X_{(n_i+M/2)}$ with $i \in [\![1;K]\!]$.

At step S25 the signal is emitted by Tx1 4.2.6 and Tx2 4.2.7.

Referring to FIG. 5.3 there is shown a flowchart representing the steps of extracting reference signals in the radio signal according to the invention.

At step S31 the extractor 4.3.2 is configured according to the configuration of the RS insertion module (4.1.9 or 4.2.2). The same configurations pre-parametred in the RS insertion module (4.1.9 or 4.2.2) may be pre-parametred in the extractor 4.3.2. The transmitter 1.1 can optionally send control information to the receiver 1.2 through a control channel, this control information pointing the configuration to set for extracting the reference signal being sent by the transmitter.

At step S32 the extractor 4.3.2 extracts parts of the signals outputted by the ADCs 4.3.1 during the time periods corresponding with the received samples of the reference signals. The extraction is conduct as described in FIG. 4.3.

At step S33 the samples of the reference signals are processed as previously described.

At step S34 the channel estimation module 4.3.3 compares these reference signals with reference values, that is the corresponding values of the emitted samples of the reference signals, to obtain a channel estimation quality. The channel estimation module 4.3.3 may also specify a previously obtained channel estimation quality.

At step S35 the signal received is then processed, using the channel estimation quality to enhance the performance of the processing. For example the PAPR preserving SFBC de-combiner 4.3.4 may be set to compensate the corruption (phase shift, amplitude . . . ) of the signal in the channel between transmitter and receiver.

The invention claimed is:

1. A method for inserting K pairs of a first and a second Reference Signals in a radio signal to be transmitted over a wireless communication system, said radio signal being intended to be emitted by an emitter comprising at least two transmit antennas, each antenna being configured for transmitting on at least an even number M, strictly greater than 4, of different frequencies, and K being a strictly positive integer strictly smaller than M/2, said radio signal being provided by:
applying an M size DFT to a block of symbols $X = (X_0, \ldots X_{M-1})$, and obtaining for each $k^{th}$ frequency, with $k=0$ to $M-1$, a complex symbol $S_k$ in the frequency domain;
obtaining, at an output of an IDFT module corresponding to a first transmit antenna, during a given time interval a first signal representing, in the frequency domain, the complex symbols $S_k$ for each $k^{th}$ frequency with $k=0$ to $M-1$;
obtaining, at an output of an IDFT module corresponding to a second transmit antenna, during the given time interval a second signal representing, in the frequency domain, the complex symbols $(-1)^{k+1} \varepsilon S^*_{(p-1-k)[M]}$ for each $k^{th}$ frequency, with $k=0$ to $M-1$ and p a predefined even integer lower or equal to M-1 and higher or equal to 0 $\varepsilon$ is 1 or -1 and $S_k^*$ being the complex conjugate of $S_k$;
emitting the radio signal corresponding to the first and second signal;
said method comprising:
determining K integers, where $$\{n_i | i \in [\![1; K]\!], 0 \le n_i \le \frac{M}{2} - 1, \forall i, j \in [\![1; K]\!]^2, i < j \Rightarrow n_i < n_j\};$$

and for each pair i of first and second Reference Signals:
inserting the first Reference Signal in the radio signal, where samples of the first Reference Signal are in time periods in the radio signal, said time periods being dependent on a position $n_i$ of the symbol $X_{n_i}$ in the block of symbols;
inserting the second Reference Signal in the radio signal, where samples of the second Reference Signal are in time periods in the radio signal, said time periods being dependent on the position $(n_i+M/2)$ of the symbol $X_{(n_i+M/2)}$ in the block of symbols.

2. The method according to claim 1, wherein for each pair i, inserting the first and second Reference Signals is done by setting values of symbol $X_{n_i}$ and symbol $X_{(n_i+M/2)}$ to respectively values representing the first and second Reference Signals of pair i, before applying the DFT.

3. The method according to claim 1, said method further comprising setting the values of the symbols $X_{n_i}$ and of the symbols $X_{(n_i+M/2)}$ to 0, with $i \in [\![1;K]\!]$, before applying the DFT and obtaining subsequent first and second signals at the output of the respective IDFT modules;
and wherein for each pair i, inserting the first and second Reference Signals is done by adding the samples of the first Reference Signal and the samples of the second Reference Signal to said subsequent signals at the output of the respective IDFT modules.

4. The method according to claim 3, said method further comprising, to set the subsequent signals to 0 at least during one of the time periods dependent on the position $n_i$, for at least one $i \in [\![1;K]\!]$, and/or to 0 at least during one of the time periods dependent on the position $n_i+M/2$, for at least one $i \in [\![1;K]\!]$ before inserting the samples of the first and second Reference Signals of pair i.

5. The method according to claim 1, said method further comprising determining:
a number L of pairs of positive integer $k_l$ and $k'_l$ with $l \in [\![1;L]\!]$, with L strictly greater than 1, where:

$K_1 = 1, k'_L = K$, $\forall l \in [\![1;L-1]\!], k_l < k'_l < k_{l+1} < k'_{l+1}$, a positive integer d strictly greater than 1;
the K integers $n_i$, with $i \in [\![1;K]\!]$ where:

$\forall l \in [\![1;L-1]\!], n_{k_{l+1}} - n_{k'_l} \ge d$ $\forall l \in [\![1;L]\!], n_{k'_l} - n_{k_l} = k'_l - k_l$.

6. The method according to claim 1, said method further comprising determining:
a positive integer d strictly greater than 1;
the K integers $n_i$, with $i \in [\![1;K]\!]$ where:

$n_{i+1} - n_i \ge d$.

7. The method according to claim 1, wherein $n_K - n_1 = K - 1$.

8. The method according to claim 7, further comprising:
determining a positive integer $K_{CP}$ where $K_{CP} \le \lfloor K/2 \rfloor$;
wherein for each pair i where $i \in [\![1;K_{CP}]\!]$, a value $p_{n_i}$, where the samples in the radio signal that are obtained from the symbol $X_{n_i}$ whose value is set to $p_{n_i}$ are equal to the samples of the first reference signal of pair i in the radio signal, is equal to a value $$p_{(n_i+K-K_{CP})},$$

where the samples in the radio signal that are obtained from the symbol $$X_{(n_i+K-K_{CP})}$$

whose value is set to $$p_{(n_i+K-K_{CP})}$$

are equal to the samples of the first reference signal of pair i+K-$K_{CP}$ in the radio signal; and/or a value $p_{(n_i+M/2)}$, where the samples in the radio signal that are obtained from the symbol $X_{(n_i+M/2)}$ whose value is set to $p_{(n_i+M/2)}$ are equal to the samples of the second reference signal of pair i in the radio signal, is equal to a value $$p_{(n_i+K-K_{CP}+M/2)},$$

where the samples in the radio signal that are obtained from the symbol $$X_{(n_i+K-K_{CP}+M/2)}$$

whose value is set to $$p_{(n_i+K-K_{CP}+M/2)}$$

are equal to the samples of the second reference signal of pair i+K-$K_{CP}$ in the radio signal.

9. The method according to claim 1, wherein a value $p_{n_i}$, where the samples in the radio signal that are obtained from the symbol $X_{n_i}$ whose value is set to $p_{n_i}$ are equal to the samples of the first reference signal of pair i in the radio signal, is a component of a CAZAC sequence; and/or wherein a value $p_{(n_i+M/2)}$, where the samples in the radio signal that are obtained from the symbol $X_{(n_i+M/2)}$ whose value is set to $p_{(n_i+M/2)}$ are equal to the samples of the second reference signal of pair i in the radio signal, is a component of a CAZAC sequence.

10. The method according to claim 1, wherein a value $p_{n_i}$, where the samples in the radio signal that are obtained from the symbol $X_{n_i}$ whose value is set to $p_{n_i}$ are equal to the samples of the first reference signal of pair i in the radio signal, is equal to a value $p_{(n_i+M/2)}$, where the samples in the radio signal that are obtained from the symbol $X_{(n_i+M/2)}$ whose value is set to $p_{(n_i+M/2)}$ are equal to the samples of the second reference signal of pair i in the radio signal.

11. The method according to claim 1, wherein a maximum module among the modules of values $p_{n_i}$ and $p_{(n_i+M/2)}$ with $i \in [\![1;K]\!]$, each $p_{n_i}$, respectively $p_{(n_i+M/2)}$, where for the samples in the radio signal that are obtained from the symbol $X_{n_i}$, respectively $X_{(n_i+M/2)}$, whose value is set to $p_{n_i}$, respectively $p_{(n_i+M/2)}$, are equal to the samples of the first reference signal of pair i, respectively the second reference signal of pair i, in the radio signal, is equal to or smaller than a maximum module among modules of modulation symbols of a digital modulation scheme used to obtain said block of symbols.

12. A non-transitory computer readable medium having stored thereon a computer program product comprising code instructions to perform the method according to claim 1, when said instructions are run by a processor.

13. A device for inserting K pairs of a first and a second Reference Signals in a radio signal to be transmitted over a wireless communication system, said radio signal being intended to be emitted by an emitter comprising at least two transmit antennas, each antenna being configured for transmitting on at least an even number M, strictly greater than 4, of different frequencies, and K being a strictly positive strictly smaller than M/2, said radio signal being processed by:

applying a M size DFT to a block of symbols X= ($X_0, \ldots X_{M-1}$), and obtaining for each $k^{th}$ frequency, with k=0 to M-1, a complex symbol $S_k$ in the frequency domain;

obtaining, at an output of an IDFT module corresponding to a first transmit antenna, during a given time interval a first signal representing, in the frequency domain, the complex symbols $S_k$ for each $k^{th}$ frequency with k=0 to M-1;

obtaining, at an output of an IDFT module corresponding to a second transmit antenna, during the given time interval a signal representing, in the frequency domain, the complex symbol $(-1)^{k+1} \varepsilon S^*_{(p-1-k)[M]}$ for each $K^{th}$ frequency, with k=0 to M-1 and p a predefined even integer lower or equal to M-1 and higher or equal to 0 and $\varepsilon$ is 1 or -1 and $S_k^*$ being the complex conjugate of $S_k$;

emitting the radio signal corresponding to the first and second signal;

said device being configured to:
determine K integers where $$\{n_i | i \in [\![1;K]\!], 0 \leq n_i \leq \frac{M}{2}-1, \forall\, i, j \in [\![1;K]\!]^2, i < j \Rightarrow n_i < n_j\};$$

and for each pair i of first and second Reference Signals:

insert the first Reference Signal in the radio signal, where samples of the first Reference Signal are in time periods in the radio signal, said time periods being dependent on a position $n_i$ of the symbol $X_{n_i}$ in the block of symbols;

insert the second Reference Signal in the radio signal, where samples of the second Reference Signal are in time periods in the radio signal, said time periods being dependent on the position $n_i+M/2$ of the symbol $X_{(n_i+M/2)}$ in the block of symbols.

14. A method for extracting K pairs of a first and a second Reference Signals in a radio signal receivable over a wireless communication system, said radio signal being emitted by an emitter comprising at least two transmit antennas, each antenna being configured for transmitting on at least an even number M, strictly greater than 4, of different frequencies, and K being a strictly positive integer strictly smaller than M/2, the emission of the radio signal being processed by:

applying a M size DFT to a block of symbols $X=(X_0, \ldots X_{M-1})$, and obtaining for each $k^{th}$ frequency, with k=0 to M−1, a complex symbol $S_k$ in the frequency domain;

obtaining, at an output of an IDFT module corresponding to a first transmit antenna, during a given time interval a first signal representing, in the frequency domain, the complex symbols $S_k$ for each $k^{th}$ frequency with k=0 to M−1;

obtaining, at an output of an IDFT module corresponding to a second transmit antenna, during the given time interval a signal representing, in the frequency domain, the complex symbol $(-1)^{k+1} \varepsilon S^*_{(p-1-k)[M]}$ for each $k^{th}$ frequency with k=0 to M−1 and p a predefined even integer lower or equal to M−1 and higher or equal to 0 and ε is 1 or −1 and $S_k^*$ being the complex conjugate of $S_k$;

emitting the radio signal corresponding to the first and second signal;

said method comprising:

extracting, before applying DFT modules on the received radio signal, parts of the radio signal, each part being received in one time window among time windows, said time windows being strictly included in the given time interval;

processing said extracted parts independently from other parts of the received radio signal;

wherein said time windows being defined according to time periods dependent on a position $n_i$ of the symbol $X_{n_i}$ in the block of symbols.

15. The method according to claim 14, wherein each time window among the time windows strictly includes at least one time period among the time periods.

16. The method according to claim 14, wherein each time window is strictly included in at least one time period among the time periods.

17. The method according to claim 14, wherein each time window is equal to one time period among the time periods.

18. A device for extracting K pairs of a first and a second Reference Signals in a radio signal receivable over a wireless communication system, said radio signal being emitted by an emitter comprising at least two transmit antennas, each antenna being configured for transmitting on at least an even number M, strictly greater than 4, of different frequencies, and K being a strictly positive integer strictly smaller than M/2, the emission of the radio signal being processed by:

applying a M size DFT to a block of symbols $X=(X_0, \ldots X_{M-1})$, and obtaining for each $k^{th}$ frequency, with k=0 to M−1, a complex symbol $S_k$ in the frequency domain;

obtaining, at an output of an IDFT module corresponding to a first transmit antenna, during a given time interval a signal representing, in the frequency domain, the complex symbols $S_k$ for each $k^{th}$ frequency with k=0 to M−1;

obtaining, at an output of an IDFT module corresponding to a second transmit antenna, during the given time interval a signal representing, in the frequency domain, the complex symbol $(-1)^{k+1} \varepsilon S^*_{(p-1-k)}$ for each $k^{th}$ frequency with k=0 to M−1 and p a predefined even integer lower or equal to M−1 and higher or equal to 0 and ε is 1 or −1 and $S_k^*$ being the complex conjugate of $S_k$;

emitting the radio signal corresponding to the first and second signal;

said device being configured to:

extract, before applying DFT modules on the received radio signal, parts of the radio signal, each part being received in one time window among time windows, said time windows being strictly included in the given time interval;

process said extracted parts independently from other parts of the received radio signal;

wherein said time windows being defined according to time periods dependent on a position $n_i$ of the symbol X in the block of symbols.

\* \* \* \* \*